United States Patent
Kelly et al.

(10) Patent No.: US 8,727,788 B2
(45) Date of Patent: May 20, 2014

(54) MEMORIZATION OPTIMIZATION PLATFORM

(75) Inventors: Luke Kelly, Bellevue, WA (US); Robert Dietz, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1030 days.

(21) Appl. No.: 12/147,538

(22) Filed: Jun. 27, 2008

(65) Prior Publication Data
US 2009/0325141 A1 Dec. 31, 2009

(51) Int. Cl.
*G09B 3/00* (2006.01)

(52) U.S. Cl.
USPC ............ 434/323; 434/322; 434/350

(58) Field of Classification Search
USPC ............ 434/322, 323, 350
See application file for complete search history.

(56) References Cited

U.S. PATENT DOCUMENTS

| | | | | |
|---|---|---|---|---|
| 4,218,760 A | * | 8/1980 | Levy | 715/209 |
| 4,829,431 A | * | 5/1989 | Ott et al. | 434/323 |
| 5,100,326 A | * | 3/1992 | Leep et al. | 434/129 |
| 5,147,205 A | * | 9/1992 | Gross et al. | 434/169 |
| 5,180,309 A | * | 1/1993 | Egnor | 434/323 |
| 5,437,553 A | * | 8/1995 | Collins et al. | 434/322 |
| 5,494,444 A | * | 2/1996 | Thayer et al. | 434/362 |
| 5,545,044 A | * | 8/1996 | Collins et al. | 434/322 |
| 5,577,919 A | * | 11/1996 | Collins et al. | 434/322 |
| 5,632,624 A | * | 5/1997 | Cameron et al. | 434/322 |
| 5,738,527 A | * | 4/1998 | Lundberg | 434/322 |
| 5,797,754 A | * | 8/1998 | Griswold et al. | 434/322 |
| 5,827,071 A | * | 10/1998 | Sorensen et al. | 434/323 |
| 5,865,625 A | * | 2/1999 | Baskerville | 434/157 |
| 6,022,221 A | * | 2/2000 | Boon | 434/156 |
| 6,024,577 A | * | 2/2000 | Wadahama et al. | 434/322 |
| 6,039,575 A | * | 3/2000 | L'Allier et al. | 434/323 |
| 6,077,085 A | * | 6/2000 | Parry et al. | 434/322 |
| 6,112,051 A | * | 8/2000 | De Almeida | 434/362 |
| 6,210,170 B1 | * | 4/2001 | Sorensen et al. | 434/323 |
| 6,419,496 B1 | * | 7/2002 | Vaughan, Jr. | 434/322 |
| 6,551,109 B1 | * | 4/2003 | Rudmik | 434/322 |
| 6,579,100 B1 | * | 6/2003 | Clark et al. | 434/172 |
| 6,778,807 B1 | * | 8/2004 | Martino et al. | 434/362 |
| 7,052,277 B2 | * | 5/2006 | Kellman | 434/118 |
| 7,364,432 B2 | * | 4/2008 | Berman | 434/323 |
| D601,628 S | * | 10/2009 | Escobar | D19/59 |

(Continued)

FOREIGN PATENT DOCUMENTS

| | | |
|---|---|---|
| WO | 2008008370 A2 | 1/2008 |
| WO | 2008027033 A1 | 3/2008 |

OTHER PUBLICATIONS

"Anki" http://www.lchi2.net/anki/.

(Continued)

*Primary Examiner* — Robert J Utama
(74) *Attorney, Agent, or Firm* — Steve Crocker; Brian Haslam; Micky Minhas

(57) ABSTRACT

A method and system for optimizing memorization of stored content. One or more discrete units of content selected for memorization are obtained. The units of content as displayed to the user according to a pre-determined order. Feedback is received from the user indicating the level of memorization achieved by the user corresponding to the displayed units of content. The subsequent order to display content is adjusted to achieve an optimized order for memorization based on the feedback received.

23 Claims, 22 Drawing Sheets

(56) References Cited

U.S. PATENT DOCUMENTS

| | | | |
|---|---|---|---|
| 7,632,101 B2* | 12/2009 | Braunberger et al. | 434/322 |
| 2002/0115044 A1* | 8/2002 | Shpiro | 434/156 |
| 2002/0115050 A1* | 8/2002 | Roschelle et al. | 434/350 |
| 2002/0137012 A1* | 9/2002 | Hohl | 434/156 |
| 2003/0129574 A1 | 7/2003 | Ferriol et al. | |
| 2004/0142312 A1* | 7/2004 | Ho et al. | 434/219 |
| 2005/0028131 A1 | 2/2005 | Moukara | |
| 2006/0228691 A1 | 10/2006 | Chen | |
| 2006/0235813 A1 | 10/2006 | Chakraborty | |
| 2007/0190505 A1 | 8/2007 | Hugonnard-Bruyere et al. | |
| 2008/0076109 A1 | 3/2008 | Berman | |

OTHER PUBLICATIONS

"Fullrecall 1.1.22" http://www.filedudes.com/FullRecall-download-15956.html.

"Heffalump: A Flashcard-Based Memorisation Tool" http://www.iwilcox.me.uk/heffalump/.

"Repetition Spacing Algorithm used in SuperMemo 2002 through SuperMemo 2006" http://www.supermemo.com/english/algsm11.htm.

"Welcome to the Mnemosyne Project" http://www.mnemosyne-proj.org/.

\* cited by examiner

| Deck | Score | Date | |
|---|---|---|---|
| ⊟ 📁 Senior Year | ○ 60% | 09/21/2007 to 06/05/2008 | |
|   ⊟ 📁 2nd Semester | ○ 65% | 01/10/2008 to 06/05/2008 | |
|     ⊞ 📁 Period 1 - Physics | ○ 98% | 03/15/2008 to 06/05/2008 | |
|     ⊟ 📁 Period 2 - Calculus | ○ 50% | 03/15/2008 to 06/05/2008 | |
|       ⊟ 📁 Trig Identities | ○ 30% | 03/17/2008 | |
|         📇 01 | ○ 20% | 03/17/2008 | |
|         📇 02 | ○ 95% | 03/17/2008 | |
|         📇 03 | ○ 35% | 03/17/2008 | |
|         📇 04 | ○ 70% | 03/17/2008 | |
|         📇 05 | ○ 10% | 03/17/2008 | |

MEMORIZATION OPTIMIZATION PLATFORM

BACKGROUND

Computerized systems have made a significant contribution towards the advancement of modern society and are utilized in a number of applications to achieve advantageous results. The field of education is one such example that has benefited from the utilization of computerized systems.

In particular, the emergence of the Internet, a network of distributed computers and computerized devices, has made a significant contribution towards the advancement of education. The unprecedented speed, versatility and capacity available through which information can be communicated and disseminated over the Internet have revolutionized numerous traditional practices of education, most notably research and the distribution of learning material.

Another example of an educational practice that has benefited from the utilization of computerized systems is the practice of traditional memorization techniques. Conventional education techniques—particularly at earlier stages of development—often focus on the retention and recitation of memorized information. Common education techniques involve introducing a concept or a sample of data to a student, who is instructed to assimilate and distill the material, before being asked to apply the concept or recite the material (classically during an "examination").

Effective tools have been developed to assist students in memorizing material. One of the most primitive tools (still in frequent use today) is the use of "flash cards," usually implemented as a unit of double sided material (usually some composition of paper or other wood-based fibers) upon which a discrete reference (typically a question) related to the material to be memorized is visually incorporated on one side of the material and an appropriate response (e.g., an answer) to the reference is visually incorporated on the other side of the material. Visual incorporation typically comprises a textual description, but may include static graphic references (e.g., pictures). The displacement of the question from the answer being so that at any time, only one of the reference and the response is ever intended to be visible.

Accordingly, conventional application of flash cards to a memorizing program includes self-selective "quizzing" of the material by the user, wherein an assessor (on occasion the user himself) assesses the memory of the user regarding the material referenced by the flash card by displaying the reference to the user, soliciting a response from the user to the question, and verifying the accuracy of the user-submitted response with the "correct" response displayed on the reverse side of the flash card. A common practice is to repeat displaying the units of material (e.g., the individual flash cards) to the user. To vary the difficulty of the memorization program, subsequent displays of the flash cards may be presented in varying sequences.

Contemporary implementations of flash cards and similar memory assessment tools using more recent technology typically include displaying the "flash card" in an electronic display, wherein the display may present a single flash card with the user-selectable option to view the information on the "reverse" side of the flash card. Advantages afforded by these advancements include providing a practically limitless amount of material for each flash card. Wherein traditional flash cards may be limited by the size of the card, a computerized implementation of a flash card may not be limited as such.

Other advantages include the possibility of using non-visual references. For example, the reference to the material may comprise an audio clip or track. Visual references are also no longer limited to textual description and static graphic references. For instance, short animations or motion pictures alone, or in combination with other media types may be used as references. Finally, removing the possible clutter attributed to a plurality of traditional flash cards is another advantage offered by computerized implementations.

Unfortunately, computerized flash card and memory assessment systems frequently do not include a mechanism for optimizing the delivery of the content based on the users current knowledge of the topic being studied or quizzed. Typical flash card and memory assessment systems will display the discrete units of material (the individual cards) in some pre-determined order. Most systems offer a feature to randomize the order. However, these systems do not typically provide features for optimizing the order to allow for a more efficient memorization process.

Traditional (e.g., paper) flash card implementations allow a user to incorporate self-assessment of progress techniques to make a memorization process more efficient. For example, users who have a high ratio of successfully identifying the correct response to a reference on a flash card may find it more efficient to spend more time on other flash cards. Accordingly, traditional flash card users are able to manipulate the sequence of flash cards to adjust the frequency any particular card is displayed. However, this feature is often translated poorly or not at all among computerized flash card systems. For example, current available flash card systems may allow a user to remove a flash card from a sequence entirely, or to adjust the frequency according to a set period of time (e.g., "don't show this card again for one week"). However, these implementations are rigid and rely on the user's own approximation for when the flash card should be viewed next.

Another concern is when a flash card user has material from more than one unrelated subjects to memorize, each with different memorization deadlines (e.g., examinations). A user may prioritize material from a more imminent subject. Allotting time to memorize the subjects equally runs the risk of incomplete memorization for one or both subjects. On the other hand, spending time only on the material of one subject may leave insufficient time for the process of memorizing the other subject to complete. Computerized flash card and memory assessment systems do not provide features analogous to such techniques. As such, these systems may suffer from inefficiency and inefficacy.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments are directed to a memorization optimization system. Specifically, a system for displaying stored content to a user to optimize memorization achieved by the user for the content displayed.

In one embodiment, a method is provided to optimize the order to display the content to optimize memorization of the content. Content is displayed according to a previously established order or heuristic. User feedback corresponding to the user's level of memorization of the content displayed is collected. The user feedback is then used to adjust and further optimize the order of content subsequently presented to the user.

In another embodiment, a system is provided to create, store, manage, share and subsequently view content. Content is displayed to the user according to an order determined to optimize memorization of the content.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9 depicts an exemplary user interface for the management of collections of one or more units of content as displayed by an exemplary client application in accordance with various embodiments.

DETAILED DESCRIPTION

Figure 1:
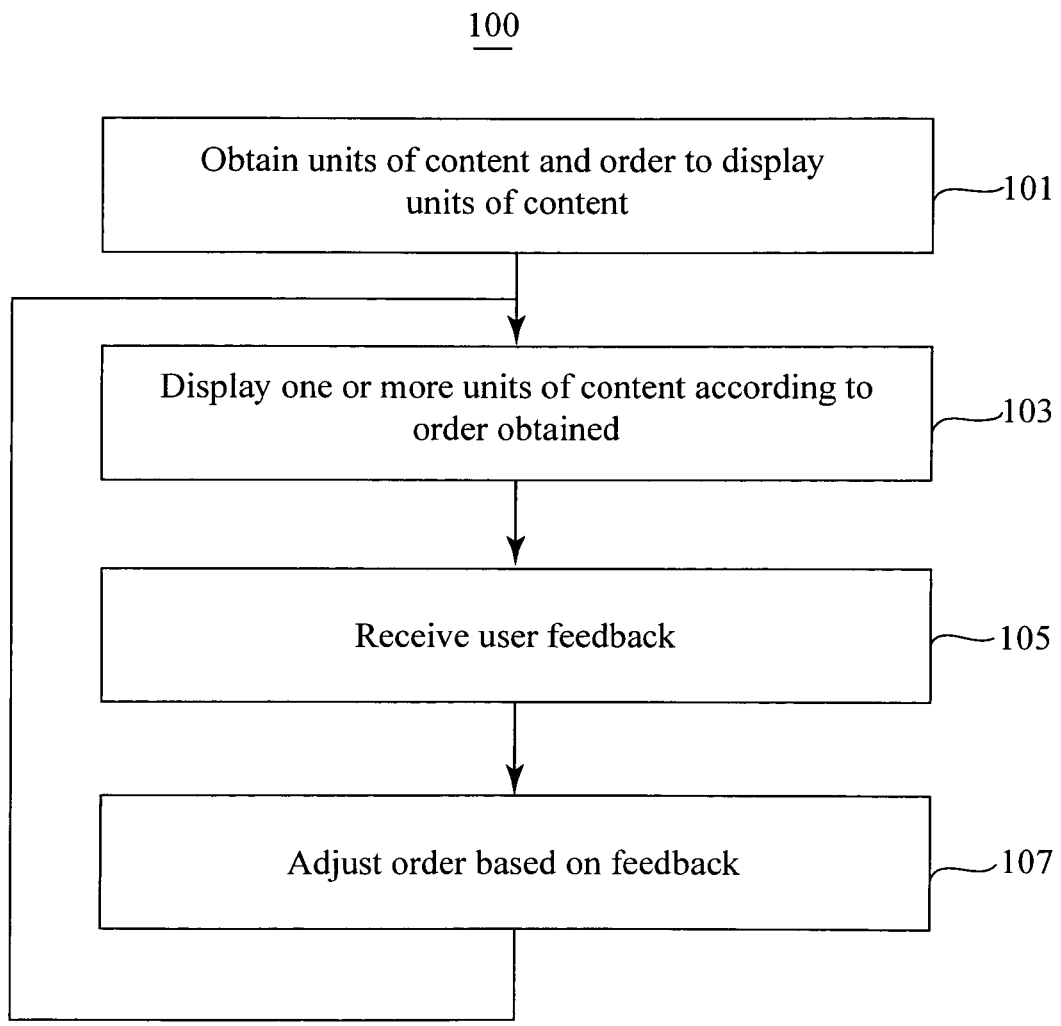
FIG. 1 depicts a flowchart of a process of optimizing the presentation of content in a memorization system in accordance with various embodiments.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 1) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing,"

"writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following embodiments, an approach is described for optimizing memorization of displayed content. Embodiments propose a way to create, manage, share and present selected content to a viewer so that memorization of the selected content is optimized.

Memorization Optimization

With reference now to FIG. 1, a flowchart 100 of a process of optimizing the presentation of content in a memorization system is depicted, in accordance with various embodiments.

With reference to step 101, one or more units of content selected for memorization, and an order to display the units of content are obtained. A unit of content may, for example, represent an individual "flash card" which comprises a corresponding pair of objects: a reference (i.e., the question portion of a flash card) to material the user has indicated a desire to memorize, and a response corresponding to the reference (i.e., the correct answer to the question). The units of content may be organized according to related subject matter, or according to any other such arrangement. In further embodiments, the reference may include in its display a plurality of possible answers, with the response displaying the correct answer.

The units of content obtained may be selected by the user individually or collectively. For example, the user may access a storage component containing a plurality of units of content, from which the user may select to obtain. Alternatively, the user may select entire collections of units of content which have been pre-designated as having a common feature or attribute (e.g., related to the same source material).

The order to display the units of content may be pre-determined according to a specific sequence, may be randomly ordered, or according to any heuristic (e.g., alphabetically, according to order created, etc. . . . ). In one embodiment, the units of content are received in a client application at the request of the user from a storage component. In further embodiments, the storage component is also a component in the system.

With reference to step 103, the one or more units of content (obtained in step 101) are displayed to the user of the system according to the order obtained in step 101. In one embodiment, the units of content are discrete (e.g., individual flash cards) and displayed to the user individually according to the order obtained. In some embodiments, the units of content are displayed in a timed sequence according to the order obtained. In further embodiments, the timing of each display is adjustable by the user. In other embodiments, a unit of content is displayed until the user elects to proceed to another unit of content, with no durational limit. In still further embodiments, a unit of content is displayed until feedback from the user is received.

In embodiments where the one or more units of content are organized collectively according to a common attribute or relevance, (e.g., related to a specific subject matter), the display of a unit of content may include an indication of the overall progress of the user in the memorization of the unit of content relative to the other units of content in the collection, or amongst all units of content selected for memorization.

With reference to step 105, feedback from the user corresponding to the units of content displayed is received by the system. Feedback from the user corresponding to the units of content displayed consists of an indication of the user's memorization of the unit of content displayed. In one embodiment, displaying a reference from a unit of content may include one or more fields for user input. The user input is received by the system as feedback and compared to the response portion of the unit of content.

In another embodiment, displaying a reference from a unit of content may include a plurality of possible responses to the reference, of which the user may select a subset (e.g., analogous to a multiple choice question and response). The user's selection is received by the system as feedback and compared to the response portion of the unit of content. In still other embodiments, the display of a reference in a unit of content may include explicit indications of knowledge and/or understanding. For example, the display of a reference in a unit of content may include selectable binary options for memorization (e.g., "already know") and a lack of memorization (e.g., "don't know"). According to some embodiments, the feedback received from the user is stored. In further embodiments, the feedback is stored within a storage component within the system.

At step 107, the order of subsequent units of content displayed to the user is adjusted to achieve an optimized order based on the feedback received at step 105. For example, if feedback received in step 105 indicates the user has successfully memorized the unit of content, the unit of content may not be displayed again in the order for some time. If feedback received in step 105 indicates the user has not successfully memorized the unit of content, the unit of content may be displayed again earlier than scheduled in the previous ordering. In one embodiment, a model of the memorization behavior of the user is generated based on the feedback received in step 105, and the order is optimized according to the generated model. In other embodiments, optimization is achieved through the application of an algorithm to the received feedback.

In some embodiments, the user may organize units of content according to subject matter. In these embodiments, the user may specify time constraints to the memorization of the units of content within a specific subject matter. For example, the user may specify that memorization of one subject matter should be achieved at some future point in time, whereas memorization of another subject matter need not be achieved until some point in time in the distant future. According to these embodiments, these time constraints may also factor into the generated model and/or algorithm to achieve an optimized order.

Once the order of the units of content is optimized, the next unit of content according to the optimized order is displayed to the user, as in step 103, after which the process as described in steps 103 to 107 is repeated.

Exemplary Client Application

Figure 2:
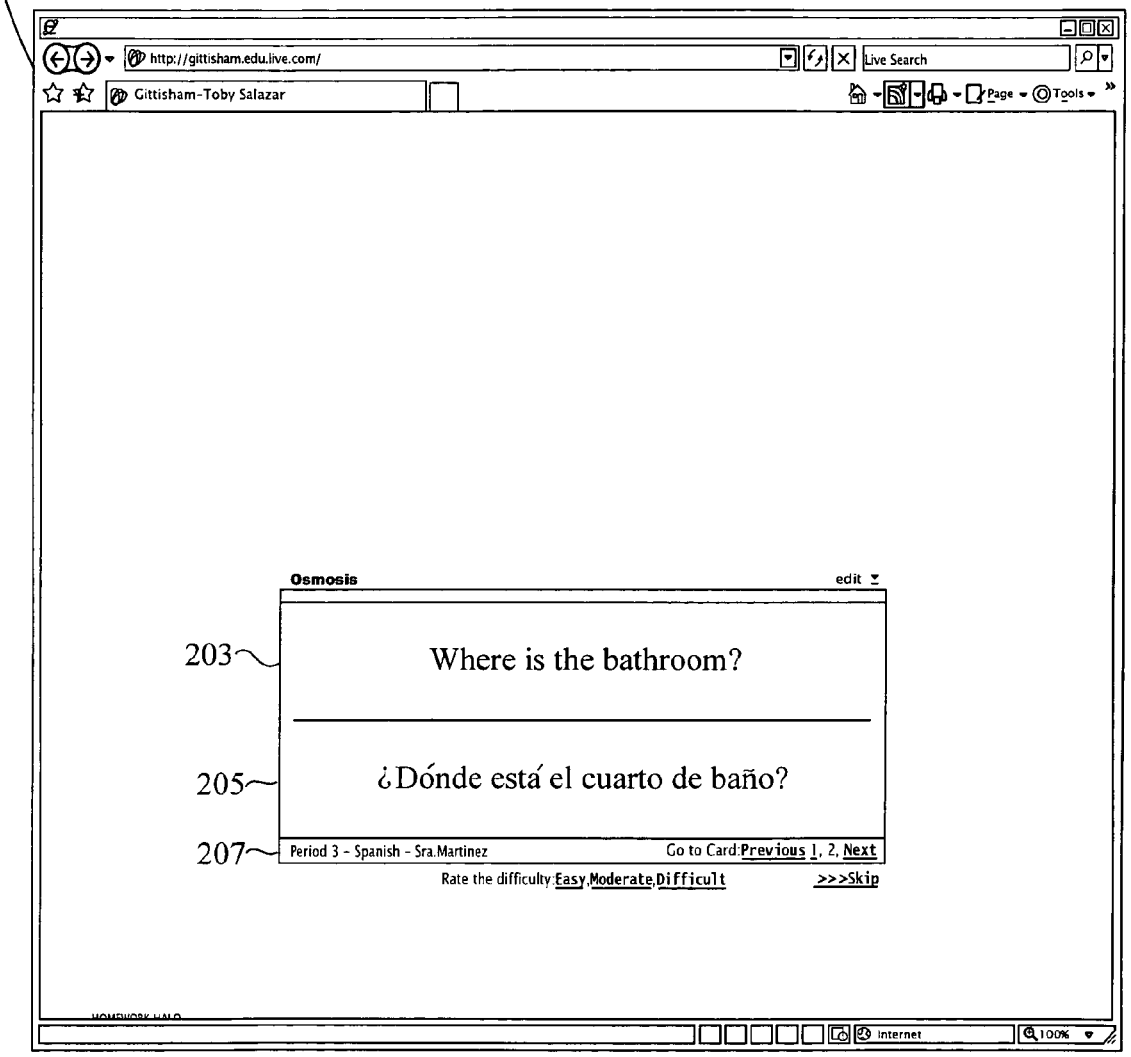
FIG. 2 depicts an exemplary client application implemented as a web page in accordance with various embodiments.

With reference now to FIG. 2, an exemplary client application implemented as a web page 200 is depicted, in accordance with various embodiments. FIG. 2 includes web page 200, web browser 201, reference field 203, response field 205, and unit information display 207.

As depicted, web page 200 is an exemplary implementation of a client application in a memorization optimization system according to various embodiments. Web page 200 may display units of content obtained from a web service platform. In some embodiments, web page 200 has functionality to perform certain system activities, including "study content," "create content," "manage content," and "share content." Study content displays units of content to the user according to a determined order, receives feedback from the user, and uses the feedback to optimize the subsequent order of units of content displayed (as described in the description for FIG. 1). Create content allows the user to create additional units of content. Manage content allows a user to organize units of content. Share content allows the user to transfer one or more units of content, or one or more collections of units of content with other users of the system. As presented, web page 200 displays a unit of content referencing translation of a spoken phrase from English to Spanish.

As shown, web browser 201 allows the user to visit and interface with web page 200. Web browser 201 may be implemented according to any conventionally known protocol and/or standard.

As depicted, web page 200 includes reference field 203. Reference field 203 displays the reference specific to the current unit of content. In one embodiment, reference field 203 may display the question portion of the flash card the current unit of content represents. For example, as depicted, reference field 203 displays the question "Where is the bathroom?"

Response field 205 displays the correct response corresponding to the reference displayed in reference field 203. As shown, response field 205 displays the correct Spanish translation of the question "Where is the bathroom?" as presented in reference field 203.

Unit information display 207 displays information corresponding to the current unit of content displayed in web browser 201. As shown, unit information display includes an indication of the subject matter and instructor corresponding to the unit of content. Other information which may be presented in unit information display includes user specific data (e.g., user scheduling, user assigned tasks, etc.), an ascertained difficulty of the reference, and an indication of the progress of memorization achieved by the user for the unit of content, among others.

Exemplary User Interface

Figure 3:
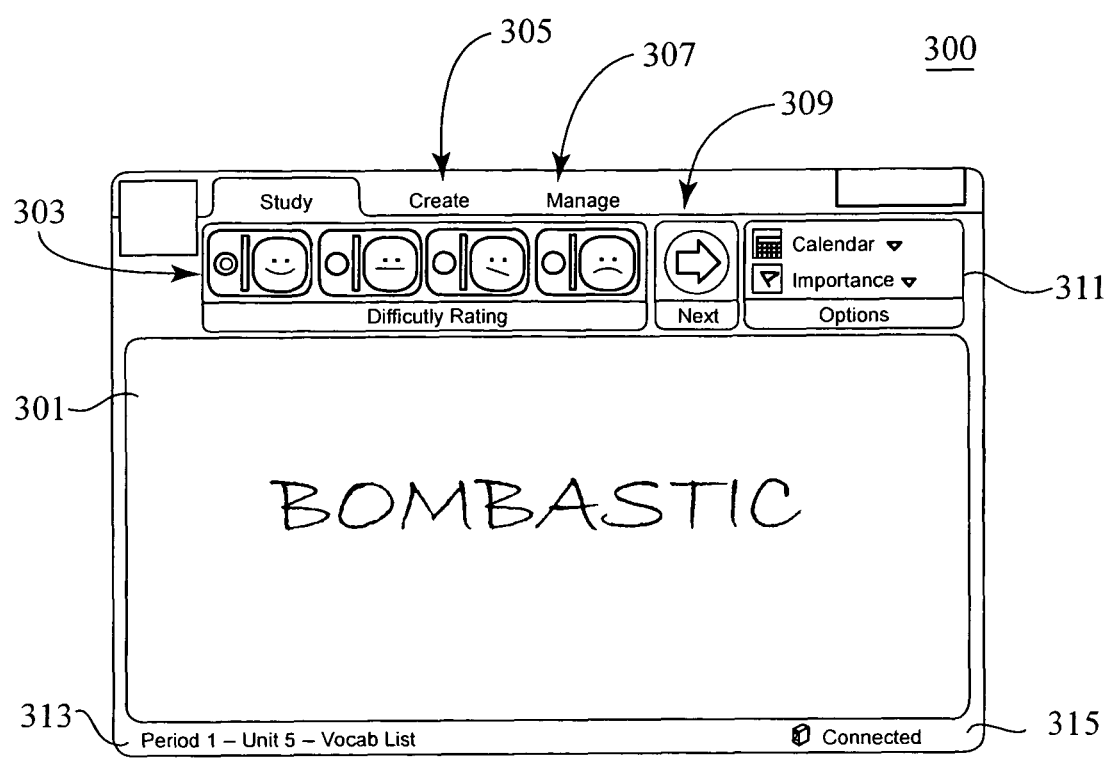
FIG. 3 depicts an exemplary user interface of a content reference in an exemplary client application is depicted in accordance with various embodiments.

With reference now to FIG. 3, an exemplary user interface 300 of a content reference in an exemplary client application is depicted, in accordance with various embodiments. As depicted, FIG. 3 is an exemplary user interface 300 for a unit of content within a collection content pertaining to vocabulary. Exemplary user interface 300 includes reference field 301, difficulty gauge 303, create tab 305, manage tab 307, next button 309, options menu 311, unit information display 313, and connection status 315.

As shown, user interface 300 depicts exemplary user interface 300 exhibiting "study content" functionality according to various embodiments. Reference field 301 displays the reference specific to the current unit of content. In one embodiment, reference field 301 may display the question portion of the flash card the current unit of content represents. In other embodiments, the reference displayed in reference field 301 may not be in the form of a direct question. For example, as depicted, reference field 301 displays the term "BOMBASTIC."

Difficulty gauge 303 allows the user to rate and/or view the difficulty of a particular reference. As show, difficulty gauge 303 includes four icons of facial expressions representing a range of emotions corresponding to difficulty. For example, a difficult question may correspond to a negative emotional representation. As depicted in exemplary user interface 300, the current rated difficulty of the displayed unit of content corresponds to a positive emotional reaction.

Create tab 305 allows access to functionality corresponding to the creation of additional units of content. Functionality corresponding to the creation of additional units of content may include, for example, inputting a reference and a corresponding response, inputting additional files (e.g., visual images or audio files) in the unit of content, and formatting the presentation of text in the unit of content.

Manage tab 307 allows access to functionality corresponding to the management of created units of content. Functionality corresponding to the management of created units of content may include, for example, displaying the progress of memorization achieved by the user with respect to a unit of content, or a collection of units of content, and the date the last time the units of content were displayed to the user.

Next button 309 allows the user to display the reference of the next unit of content in the order of display, based on the feedback received by the user. In some embodiments, if next button 309 is activated while reference field 301 displays a reference of a unit of content, the response corresponding to the reference is displayed. If next button 309 is activated while reference field 301 displays a response corresponding to a reference is displayed, next button 309 displays the next reference of the next unit of content in the order of display, so that reference field 301 alternates between displaying a reference and a response as next button 309 is activated.

Options menu 311 allows the user to set time constraints for a particular unit of content, or to assign a relative importance for a unit of content relative to the other units of content selected for memorization.

Unit information display 313 displays information corresponding to the current unit of content displayed in exemplary user interface 300. As shown, unit information display includes an indication of the subject matter corresponding to the unit of content. Other information which may be presented in unit information display includes user specific data (e.g., user scheduling, user assigned tasks, etc.), an ascertained difficulty of the reference, and an indication of the progress of memorization achieved by the user for the unit of content, among others.

Connection status 315 displays the status of the connection of the client application and the core web service platform. According to some embodiments, the core web service platform manages all of the user's content in the system. In further embodiments, the core web service platform calculates and tracks the user's progress towards memorization of that content. In still further embodiments, the core web service platform stores all the related information associated with the content that is required to calculate progress towards memorization, for example, the history of the feedback obtained via the client application.

Figure 4:
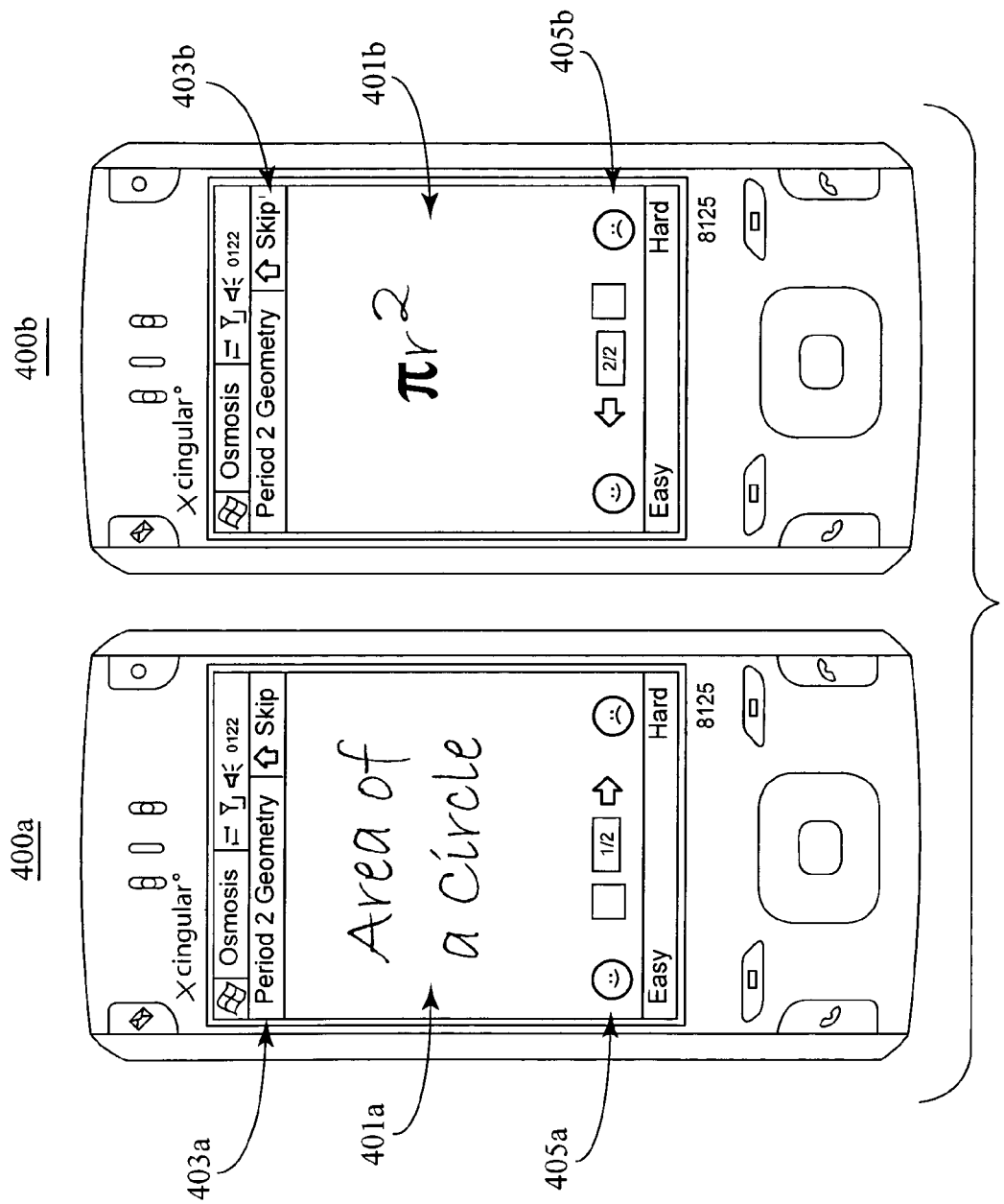
FIG. 4 depicts exemplary user interfaces of an exemplary client application implemented on a mobile communication device in accordance with various embodiments.

With reference now to FIG. 4, exemplary user interface 400a and 400b of an exemplary client application implemented on a mobile communication device are depicted in accordance with various embodiments. As depicted, FIG. 4 includes user interface 400a, displaying a reference for a unit of content within a collection of units of content pertaining to the field of geometry, and user interface 400b, displaying the response corresponding to the reference. Exemplary user interfaces 400a and 400b include display field 401a, 401b, unit information display 403a, 403b and difficulty gauge 405a, 405b.

Display field 401a displays the reference specific to the current unit of content. In one embodiment, display field 401a may display the question portion of the flash card the current unit of content represents. In other embodiments, the reference displayed in display field 401a may not be in the form of a direct question. For example, as depicted, display field 401a displays the phrase "Area of a circle."

Display field 401b displays the response corresponding to the reference displayed in display field 401b. In one embodiment, display field 401b may display the answer portion of the flash card the current unit of content represents. For example, as depicted, display field 401b displays the formula for an Area of a circle.

Unit information display 403a and 403b display information corresponding to the current unit of content displayed in exemplary user interface 400, and are otherwise equivalent to unit information display 313.

Difficulty gauge 405a, 405b allows the user to rate and/or view the difficulty of a particular reference. As show, difficulty gauge 403a and 403b include two icons of facial expressions representing a range of emotions corresponding to difficulty.

Figure 5:
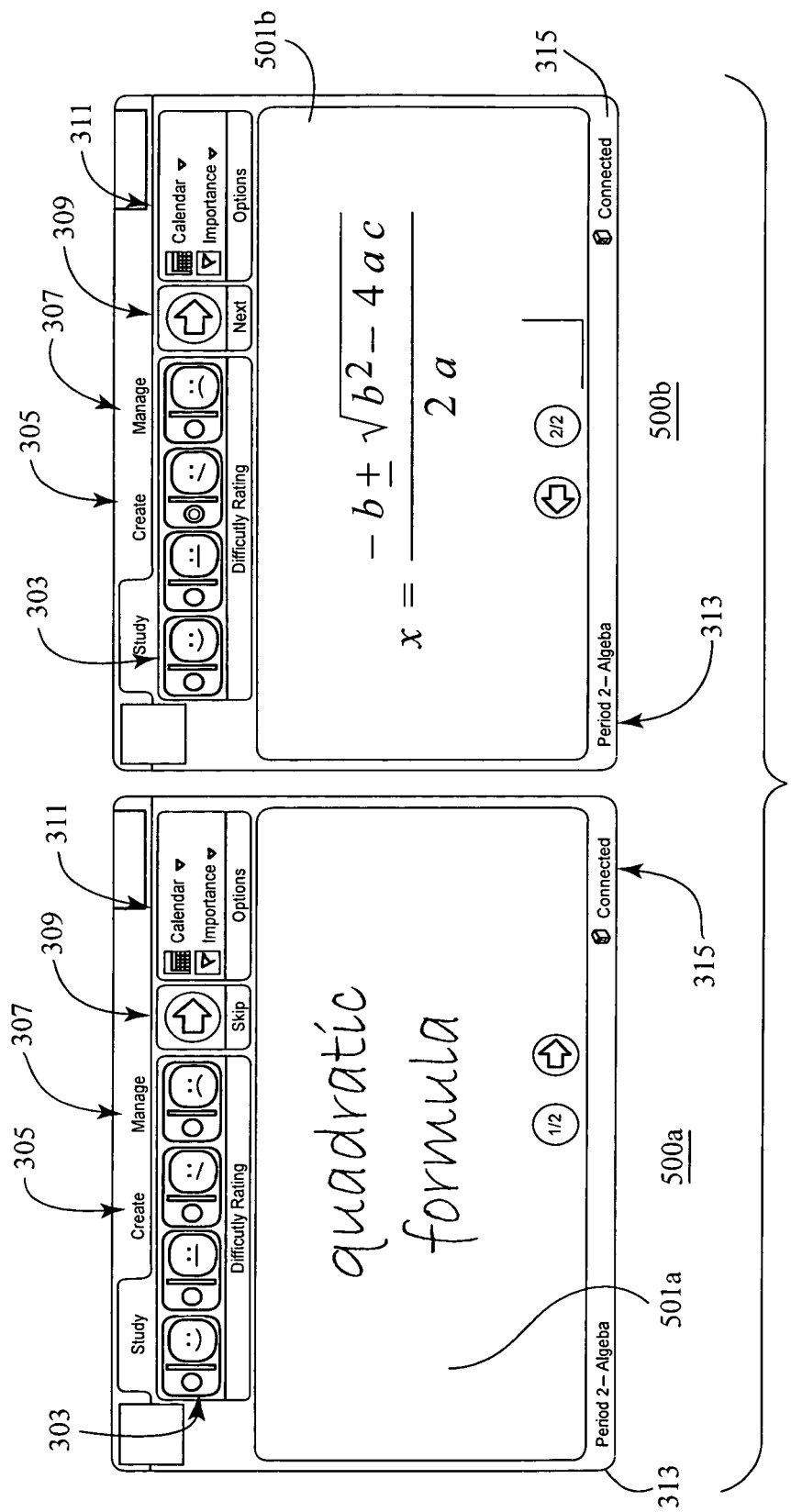
FIG. 5 depicts exemplary user interfaces of a content reference and a corresponding response as displayed by an exemplary client application in accordance with various embodiments.

With reference now to FIG. 5, exemplary user interfaces 500a and 500b of a content reference and a corresponding response as displayed by an exemplary client application are depicted in accordance with various embodiments. As depicted, FIG. 5 includes user interface 500a, displaying a reference for a unit of content within a collection of units of content pertaining to the field of algebra, and user interface 500b, displaying the response corresponding to the reference. Exemplary user interface 500a includes display field 501a. Exemplary user interface 500b includes display field 501b. Both display field 501a and 501b each include: difficulty gauge 303; create tab 305; manage tab 307; skip button 309; options menu 311; unit information display 313; and connection status 315.

Display field 501a displays the reference specific to the current unit of content. In one embodiment, display field 501a may display the question portion of the flash card the current unit of content represents. In other embodiments, the reference displayed in display field 501a may not be in the form of a direct question. For example, as depicted, display field 401a displays the phrase "quadratic formula."

Display field 501b displays the response corresponding to the reference displayed in display field 501b. In one embodiment, display field 501b may display the answer portion of the flash card the current unit of content represents. For example, as depicted, display field 501b displays the formula for the quadratic formula.

Difficulty gauge 303; create tab 305; manage tab 307; skip button 309; options menu 311; unit information display 313; and connection status 315 have been described according to foregoing embodiments. As such, repetition is herein omitted.

Figure 6:
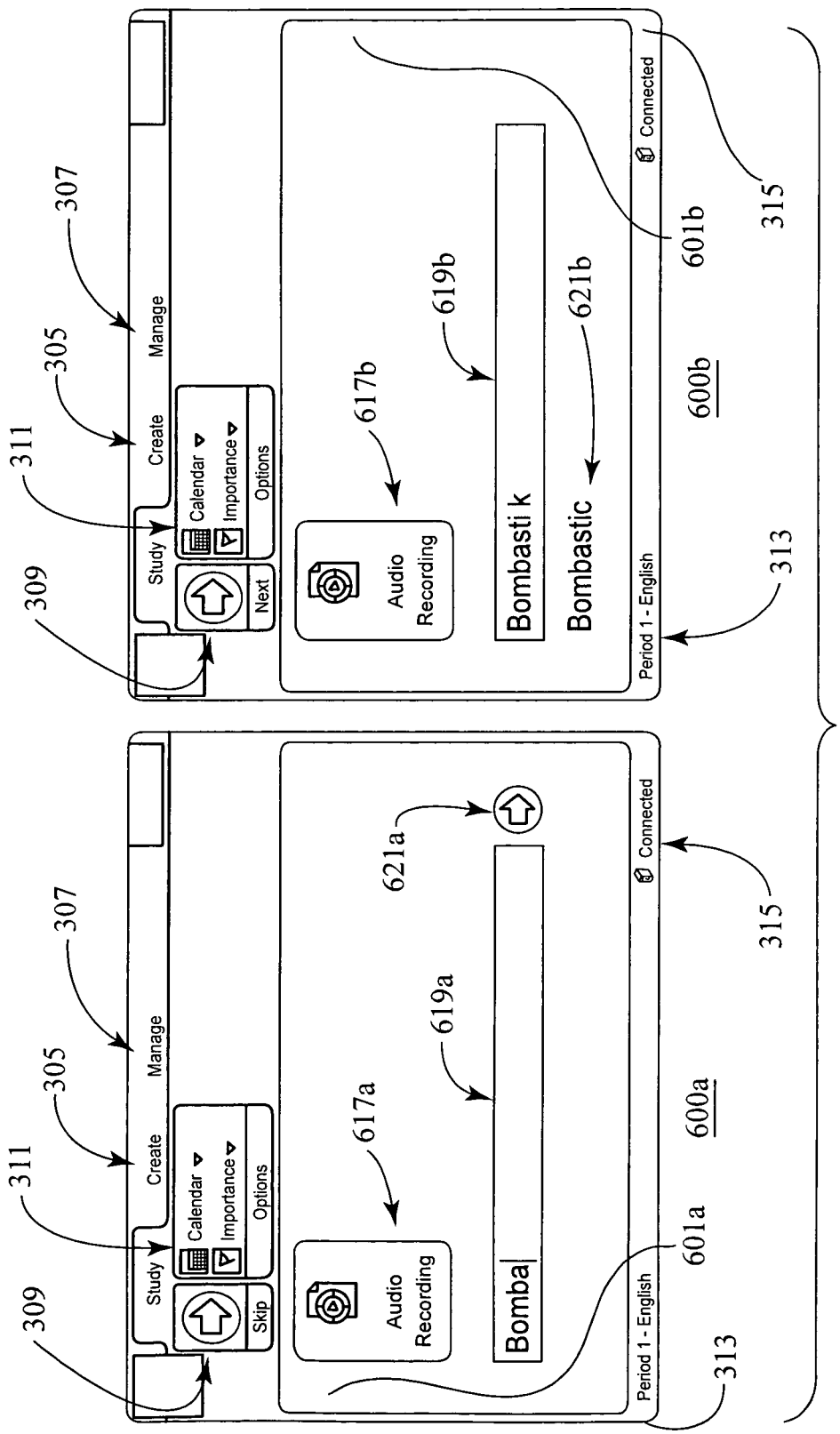
FIG. 6 depicts exemplary user interfaces of an audio content reference and a corresponding response as displayed by an exemplary client application in accordance with various embodiments.

With reference now to FIG. 6, exemplary user interfaces 600a and 600b of an audio content reference and a corresponding response as displayed by an exemplary client application are depicted in accordance with various embodiments. As depicted, FIG. 6 includes user interface 600a, displaying a reference for a unit of content within a collection of units of content pertaining to the field of English, and user interface 600b, displaying the response corresponding to the reference. Exemplary user interface 600a includes display field 601a, embedded audio recording 617a, user input field 619a, and submission button 621a. Exemplary user interface 600b includes display field 601b, embedded audio recording 617b, user input display 619b and correct response display 621b. Both display field 601a and 601b each include: create tab 305; manage tab 307; skip button 309; options menu 311; unit information display 313; and connection status 315.

Display field 601a displays the reference specific to the current unit of content. In one embodiment, display field 601a may display the question portion of the flash card the current unit of content represents. In other embodiments, the reference displayed in display field 601a may not be in the form of a direct question. In further embodiments, the reference may be an embedded audio, image, or video file accessible by the user. For example, as depicted, display field 601a includes embedded audio recording 617a. As presented, audio recording 617a may, for example, include an audio recording of the pronunciation of a word the user is to spell in user input field 619a.

User input field 619a allows the user to input the user's response to the reference presented in 601a, in this example, audio recording 617a. As depicted, audio recording 617a is an audio recording of the pronunciation of the word bombastic. 619a thus represents an exemplary attempt by a user to spell the word bombastic, according to the reference presented in audio recording 617a. Once the user's response is completed, the user is able to activate submission button 621a to submit the response, to view the correct response, and to compare the user's response with the correct response.

Display field 601b displays the response to corresponding reference displayed in display field 601a. In one embodiment, display field 601b may display the answer portion of the flash card the current unit of content represents. According to the present example, display field 601b includes embedded audio recording 617b. In some embodiments, audio recording 617b may be the same embedded file as audio recording 617a. In other embodiments, audio recording 617b may be a recorded pronunciation of the correct response. In the present example, for instance, audio recording 617b may be an audio recording of the pronunciation of the word bombastic. Audio recording 617b may also be an audio recording of the pronunciation of the letters comprising a correct spelling of the word bombastic.

As shown, display field 601b also includes user input display 619b and correct response display 621b. User input display 619b displays the user's submitted response, as entered in user input field 619a and submitted with submission button 621a. Correct response display 621b displays the correct response to the reference included in display field 601a. As shown, the correct spelling of the word bombastic is provided in correct response display 621b.

Create tab 305; manage tab 307; skip button 309; options menu 311; unit information display 313; and connection status 315 have been described according to foregoing embodiments. As such, repetition is herein omitted.

Figure 7:
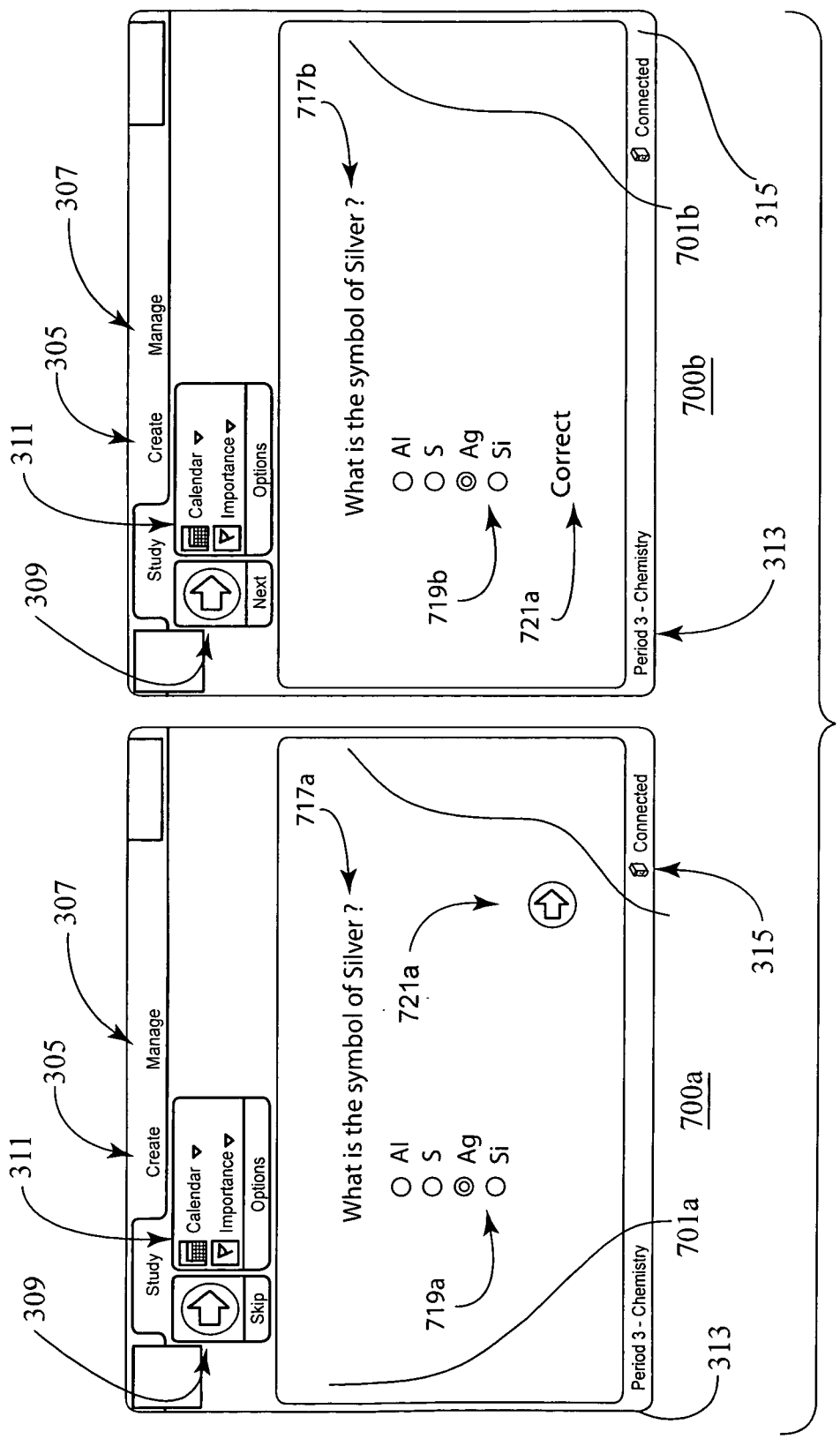
FIG. 7 depicts exemplary user interfaces of alternate presentations of a content reference and a corresponding response in accordance with various embodiments.

With reference now to FIG. 7, exemplary user interface 700a and 700b of alternate presentations of a content reference and a corresponding response are depicted in accordance with various embodiments. As depicted, FIG. 7 includes user interface 700a, displaying a reference for a unit of content within a collection of units of content pertaining to the field of Chemistry, and user interface 700b, displaying the response corresponding to the reference. Exemplary user interface 700a includes display field 701a, reference question 717a, response input field 719a, and submission button 721a. Exemplary user interface 700b includes display field 701b, reference question 717b, response display 719b and accuracy indicator 721b. Both display field 701a and 701b each include: create tab 305; manage tab 307; skip button 309; options menu 311; unit information display 313; and connection status 315.

Display field 701a displays the reference specific to the current unit of content. In one embodiment, display field 701a may display the question portion of the flash card the current unit of content represents. In other embodiments, the reference displayed in display field 701a may not be in the form of a direct question. As depicted, display field 701a includes reference question 717a. Reference question 717a displays the question "What is the symbol of Silver?" as display. As presented, response input field 719a displays a list of selectable options representing possible responses the user may choose to submit as the user's response. Once the user has selected an option to represent the user's response, the user may submit the option by activating submission button 721a.

Display field 701b displays the response to corresponding reference displayed in display field 701a. In one embodiment, display field 701b may display the answer portion of the flash card the current unit of content represents. According to the present example, display field 701b includes reference question 717b. In some embodiments, reference question 717b may display the same content as reference question 717a. In other embodiments, reference question 717b may include additional information, such as an explanation, a suggested mnemonic device, etc.

As shown, display field 701b also includes response display 719b and accuracy indicator 721b. User response display 719b displays the user's submitted response, as entered in user input field 719a and submitted with submission button 721a. As depicted response display 719b displays the same selectable options representing possible responses the user was able to choose to submit as the user's response in display field 701a, including the user's submitted response. Accuracy indicator 721b displays an indication of whether the user's submitted response conformed with the correct response. As shown, the user's submission of "Ag" as the symbol of the atomic element silver is correct, as indicated by accuracy indicator 721b.

Create tab 305; manage tab 307; skip button 309; options menu 311; unit information display 313; and connection status 315 have been described according to foregoing embodiments. As such, repetition is herein omitted.

Content Creation

Figure 8:
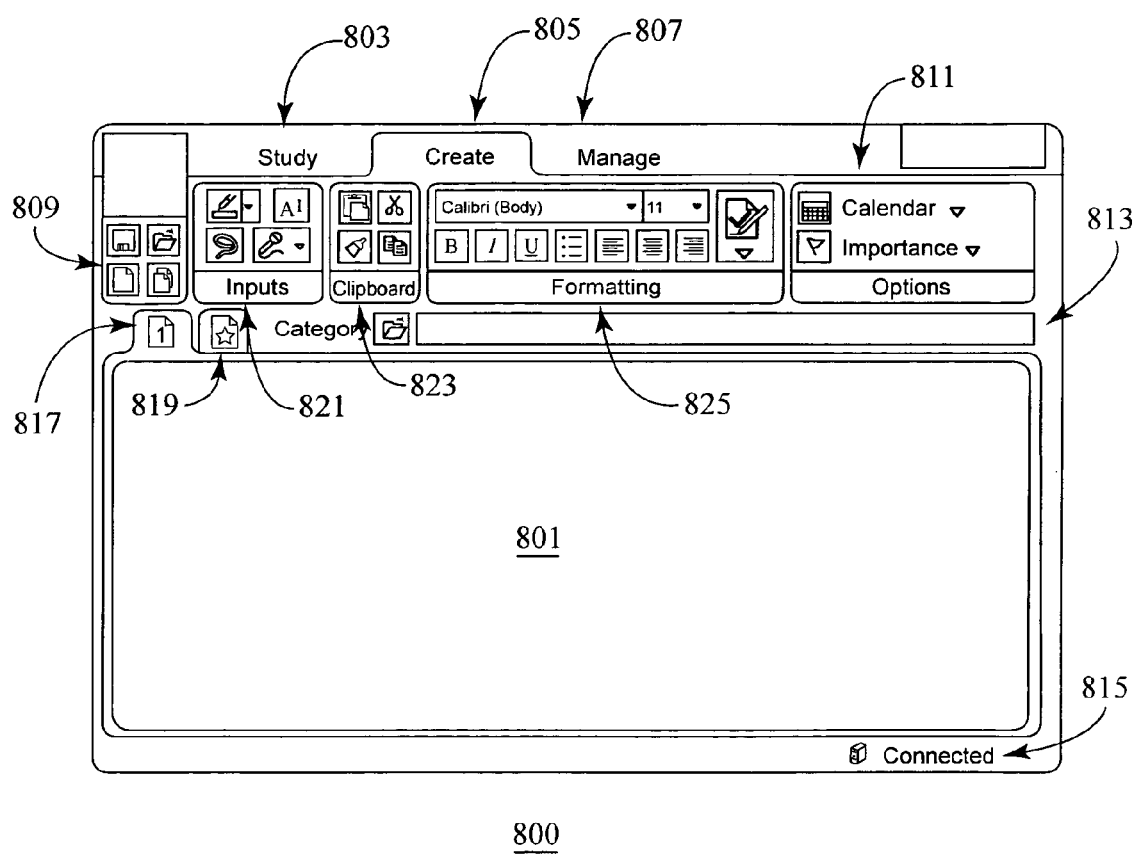
FIG. 8 depicts an exemplary user interface for the creation of a unit of content as displayed by an exemplary client application in accordance with various embodiments.

With reference now to FIG. 8, exemplary user interface 800 for the creation of a unit of content as displayed by an exemplary client application is depicted in accordance with various embodiments. As depicted, FIG. 8 includes user interface 800, displaying an exemplary user interface which features functionality for the creation of additional units of content. Exemplary user interface 800 includes display field 801, study tab 803, create tab 805, manage tab 807, file menu 809, options menu 811, unit information display 813, connection display 815 reference display tab 817, response display tab 819, input menu 821, clipboard menu 823, and formatting menu 825.

Display field 801 allows the user to input the material comprising the reference and the response to the reference. As depicted, the user is able to alternate between displaying a display field 801 for a reference by selecting reference display tab 817, and a response by selecting response display tab 819. Study tab 803 allows the user to access functionality to study created units of content, as described in foregoing descriptions for FIGS. 3, 5, 6 and 7. As depicted, create tab 805 provides functionality for the creation of a unit of content, and includes the elements of user interface 800.

Manage tab 807 allows access to functionality corresponding to the management of created units of content. Functionality corresponding to the management of created units of content may include, for example, displaying the progress of memorization achieved by the user with respect to a unit of content, or a collection of units of content, and the date the last time the units of content were displayed to the user.

According to some embodiments, user interface 800 includes file menu 809. In one embodiment, file menu 809 provides functionality typically found in the management and storage of files. For example, file menu 809 may allow the user to save the current file, open a new folder, and open one or more new files.

Options menu 811 allows the user to set time constraints for a particular unit of content, or to assign a relative importance for a unit of content relative to the other units of content selected for memorization.

Unit information display 813 allows the user to enter information corresponding to the current unit of content displayed in subsequent displays of the corresponding unit of content. As shown, unit information display includes an indication of the subject matter (e.g. "Category") corresponding to the unit of content. Other information which may be entered as unit information display includes user specific data (e.g., user scheduling, user assigned tasks, etc.), an ascertained difficulty of the reference, and an indication of the progress of memorization achieved by the user for the unit of content, among others.

Connection status 815 displays the status of the connection of the client application and the core web service platform. Connection status 815 is identical to feature 315, a description of which has been provided in the foregoing embodiments.

As previously mentioned, reference display tab 817, response display tab 819 may be used to alternate the content of display field 801 between the content of the reference of the unit of content and the response corresponding to the reference. For example, while reference display tab 817 is activated, the user may enter and modify data to be displayed as a reference when the unit of content is displayed under the study tab. On the other hand, while response display tab 819 is activated, the user may enter and modify data to be displayed as the response corresponding to the reference of the unit of content.

Input menu 821 provides functionality to allow a user to incorporate one or more files with the unit of content. According to one embodiment, input menu 821 allows the user to incorporate images, video files and audio files. According to other embodiments, input menu may also allow the user to modify the color of text displayed, or add highlighting to the text in display field 801. Clipboard menu 823 provides functionality to allow a user to edit and store portions of material to be recalled or duplicated at a later time.

Formatting menu 825 provides functionality to adjust the formatting of text displayed in display field 801. In some embodiments, functionality to adjust formatting of text includes changing the font, the size of the text, justification, and other such formatting effects.

Content Management

With reference now to FIG. 9, exemplary user interface 900 for the management of collections of one or more units of content as displayed by an exemplary client application is depicted in accordance with various embodiments. As depicted, FIG. 9 includes user interface 900, displaying an exemplary user interface which features functionality for the management of collections of one or more units of content. Exemplary user interface 900 includes collection list 901, score list 903, and date list 905.

Collection list 901 displays a list of units of content stored in the system accessible to the specific user. In some embodiments, the units of content may be organized into collections, e.g. "decks" of units of content representing flash cards. The units of content may be organized according to shared attributes and characteristics (e.g., subject material, term). As depicted, collection list 901 display a hierarchy of organized content.

Score list 903 displays a progress of memorization achieved by the user for the corresponding collection in collection list 901. For example, as depicted, a user as achieved a score of 60% memorization for the collection designated "Senior Year." The score is an aggregation of a plurality of other collections, and thus represents an average memorization achieved for each sub collection (e.g., the sub collections designated "Period 1—Physics," and "Period 2—Calculus"). In other embodiments, the score for a collection may be the average memorization achieved for each folder within each sub collection.

Date list 905 displays one or more dates corresponding to the dates the collections of content were accessed. According to some embodiments, date list 905 may include the date a unit of content within the collection was first accessed, and the last date a unit of content within the collection was accessed.

Exemplary Client Application Menu

Figure 10:
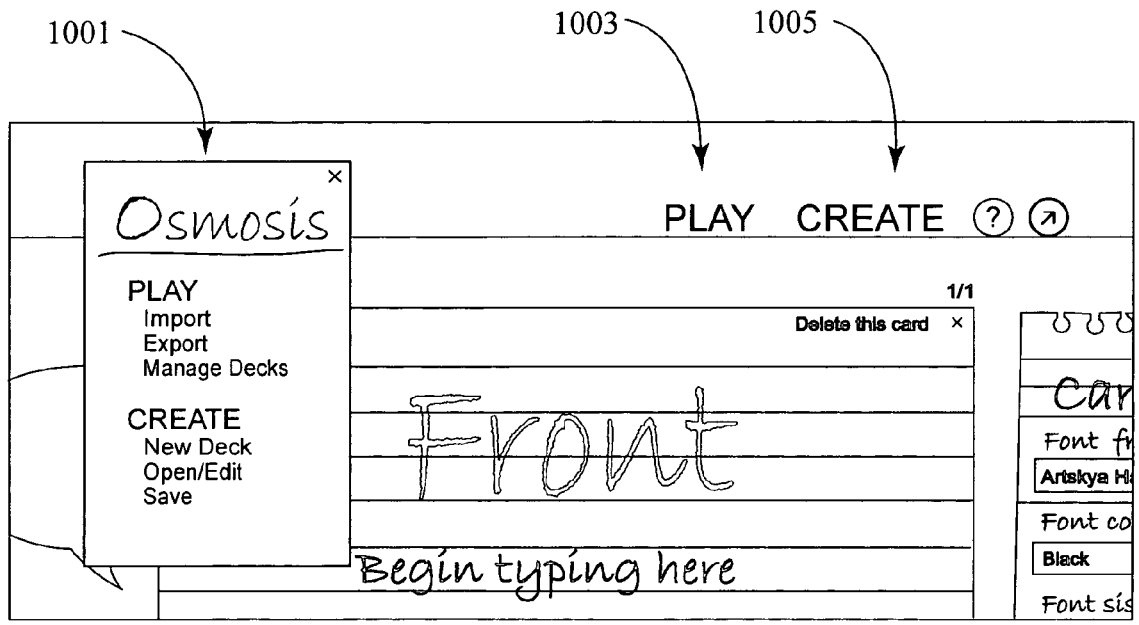
FIG. 10 depicts an exemplary user interface of an exemplary client application menu in accordance with various embodiments.

With reference now to FIG. 10, exemplary user interface 1000 of an exemplary client application menu is depicted in accordance with various embodiments. As depicted, FIG. 10 includes user interface 1000, displaying an exemplary client application menu which provides access to functionality for the collections one or more units of content. Exemplary user interface 1000 includes main menu 1001, play button 1003 and create button 1005.

Main menu 1001 displays a list of keywords representing functionality of the features directly accessible from exemplary user interface 1000. According to one embodiment, the keywords comprising main menu may operate as links to the related features. According to further embodiments, main menu 1001 may delineate accessible features according to functionality. For example, main menu 1001 may present features related to viewing units of content separated from features relating to the creation of additional units of content. As depicted, main menu 1001 includes keywords related to the import, export, management of decks as well as the creation of new decks, viewing/editing of existing decks, and storage of created decks.

According to one embodiment, play button 1003 and create button 1005 each operate as executable links to a menu of related features. For example, activating play button 1003 may execute the same action as activating the "play" link in main menu 1001. Likewise, activating create button 1005 may execute the same action as activating the "create" link in main menu 1001.

Import Content

Figure 11:
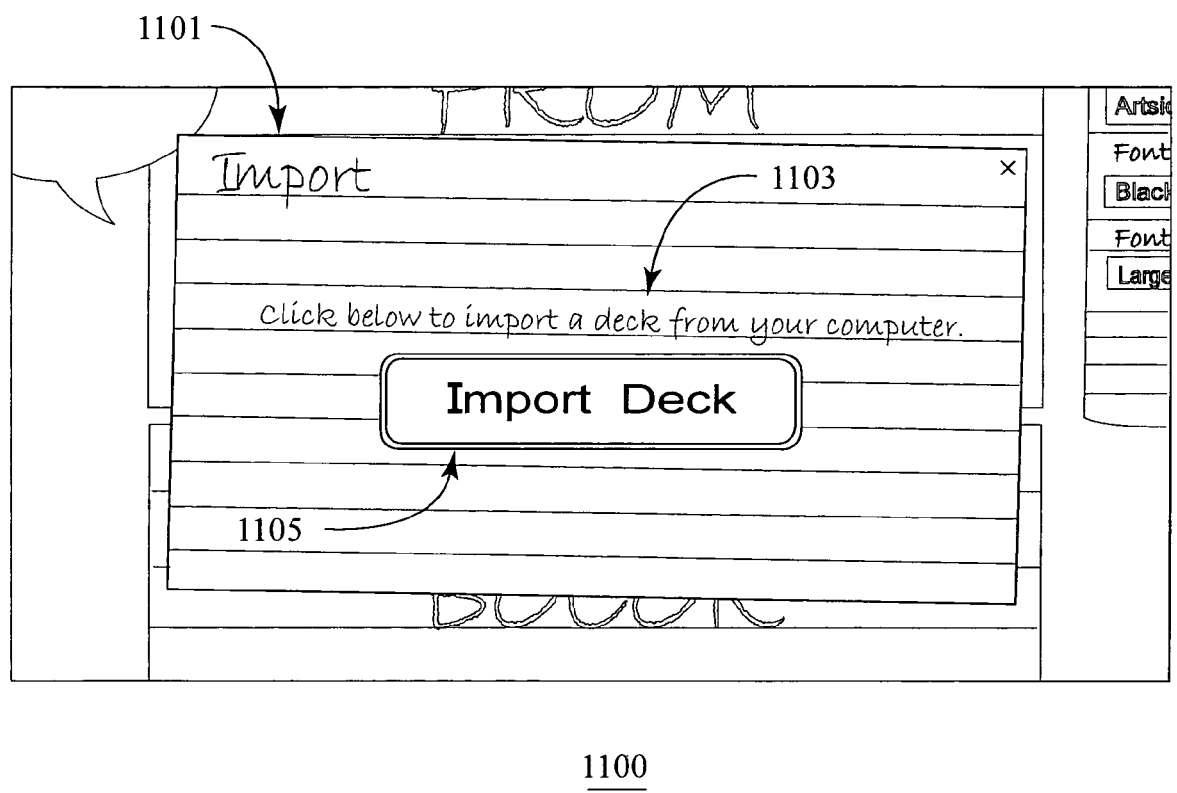
FIG. 11 depicts an exemplary user interface for importing a collection of content in accordance with various embodiments.

With reference now to FIG. 11, exemplary user interface 1100 for importing a collection of content is depicted in accordance with various embodiments. Exemplary user interface 1100 includes title 1101, instruction 1103 and activity button 1105.

Exemplary user interface 1100 provides functionality to allow a user to import a collection of one or more units of content to the client application of the user. Exemplary user interface 1100 allows the user to specify the location of a pre-created collection of content. According to one embodiment, exemplary user interface 1100 is accessed via "import" link in main menu 1001, as previously described. Exemplary user interface 1100 displays title 1101, the keyword describing the functionality of the currently displayed user interface. Exemplary user interface 1100 also displays instruction 1103. According to one embodiment, instruction 1103 displays a short instructional message describing the operation of exemplary user interface 1100. As depicted, instruction 1103 displays a short instructional message describing the procedure for importing a collection of content (e.g., a "deck") from a location to the client application. Activating activity button 1105 allows the user to execute the activity referenced by title 1101 and described by instruction 1103.

Export Content

Figure 12:
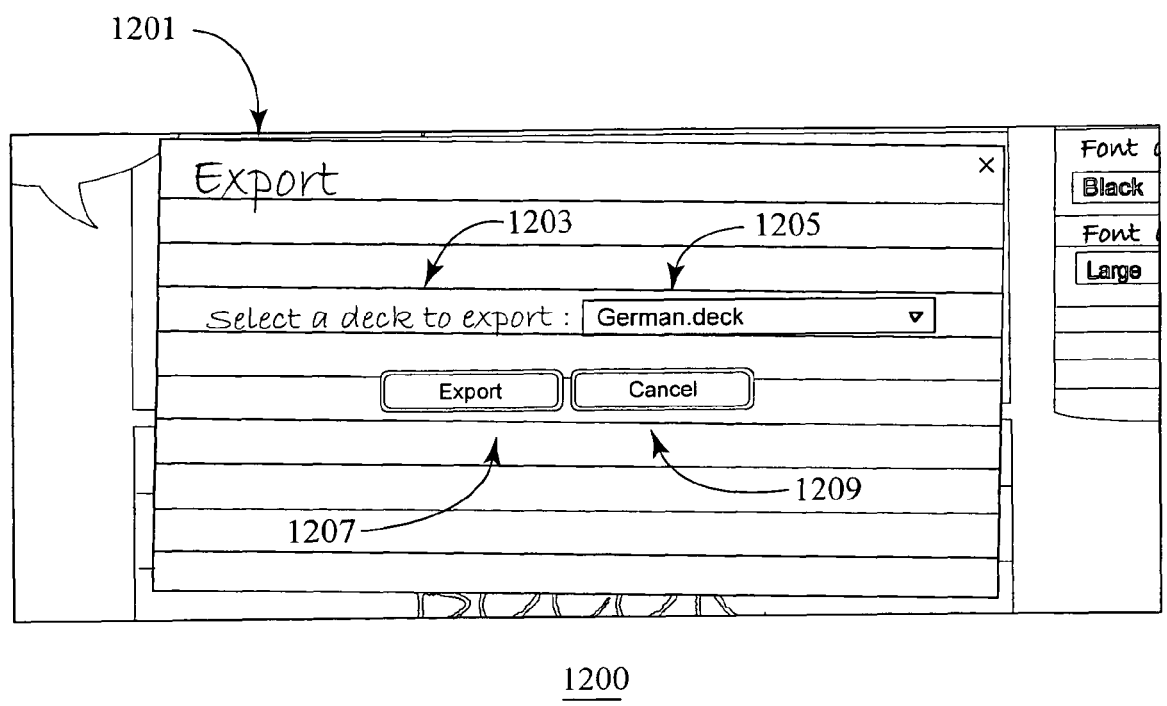
FIG. 12 depicts an exemplary user interface for exporting a collection of content in accordance with various embodiments.

With reference now to FIG. 12, exemplary user interface 1200 for exporting a collection of content is depicted in accordance with various embodiments. Exemplary user interface 1200 includes title 1201, instruction 1203, selection display 1205, activity button 1207 and cancel activity button 1209.

Exemplary user interface 1200 provides functionality to allow a user to export a collection of one or more units of content from the client application of the user. According to some embodiments, the collection of one or more units of content are exported from the client application of the user to a web service platform. According to other embodiments, the collection of one or more units of content are exported from the client application of the user directly to another client application, or to the system of the user.

According to further embodiments, exemplary user interface 1200 is accessed via "export" link in main menu 1001, as previously described. Exemplary user interface 1200 displays title 1201, one or more keywords describing the functionality of the currently displayed user interface. Exemplary user interface 1200 also displays instruction 1203. According to one embodiment, instruction 1203 displays a short instructional message describing the operation of exemplary user interface 1200. As depicted, instruction 1203 displays a short instructional message describing the procedure for exporting a collection of content from a location to the client application.

Selection display 1205 allows the user to view the file name of the file selected for export. Activity button 1207 allows the user to execute the activity referenced by title 1201 and described by instruction 1203. According to one embodiment, cancel activity button 1209 may interrupt and cancel the export of a file while the file is in the process of exporting. According to other embodiments, cancel activity button 1209 may also close user interface 1200 and return the user to the last user interface viewed prior to user interface 1200, or execute a link to main menu 1001.

Manage Content

Figure 13:
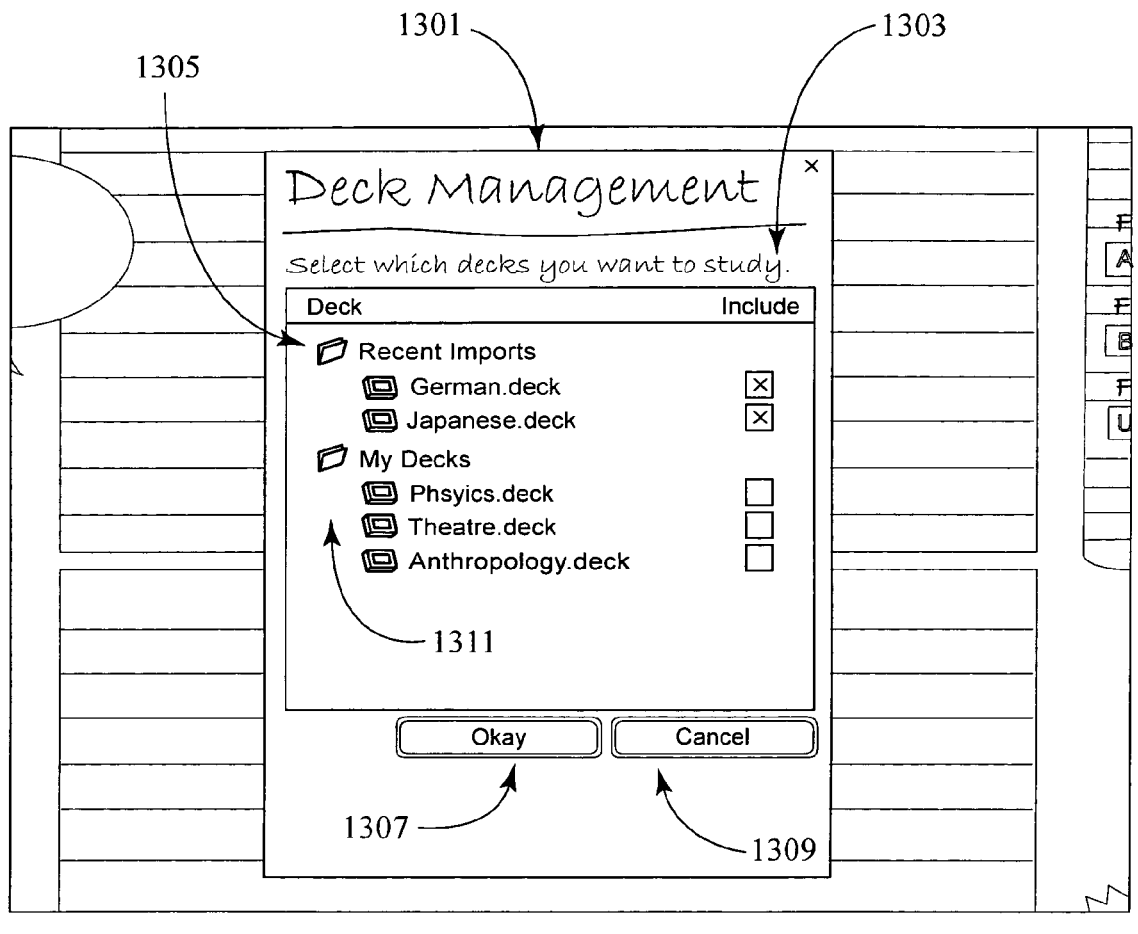
FIG. 13 depicts an exemplary user interface for managing one or more collections of content in accordance with various embodiments.

With reference now to FIG. 13, exemplary user interface 1300 for managing a collection of content is depicted in accordance with various embodiments. Exemplary user interface 1300 includes title 1301, instruction 1303, recent imports display 1305, activity button 13007 and cancel activity button 1309, and collections display 1311.

Exemplary user interface 1300 provides functionality to allow a user to manage a collection of one or more units of content from the client application of the user. According to some embodiments, exemplary user interface 1300 allows a user to select the collections of one or more units of content the user would like to study.

According to further embodiments, exemplary user interface 1300 is accessed via "manage decks" link in main menu 1001, as previously described. Exemplary user interface 1300 displays title 1301, one or more keywords describing the functionality of the currently displayed user interface. Exemplary user interface 1300 also displays instruction 1303. According to one embodiment, instruction 1303 displays a short instructional message describing the operation of exemplary user interface 1300. As depicted, instruction 1303 displays a short instructional message describing the procedure for studying one or more collections of content.

Recent imports display 1305 displays a list of collections of units of content recently imported into the client application by the user. In one embodiment, recent imports display 1305 displays a number of files comprising the last imports. For example, if the number of files displayed by recent imports display 1305 is two, the two most recent imports are displayed. In another embodiment, recent imports display 1305 may display all files which have been imported within a pre-determined period. For example, if the pre-determined period is two weeks, all files imported into the client application within the last two weeks are displayed in recent imports display 1305.

Activity button 1307 allows the user to execute the activity referenced by title 1301 and described by instruction 1303. According to one embodiment, cancel activity button 1309 may close user interface 1300 and return the user to the last user interface viewed prior to user interface 1300, or execute a link to main menu 1001. Collections display 1311 displays a list of collections created by the user. According to one embodiment, collections display 1311 includes collections of units of content imported by the user which no longer qualify as a recent import.

Create Collection of Content

Figure 14:
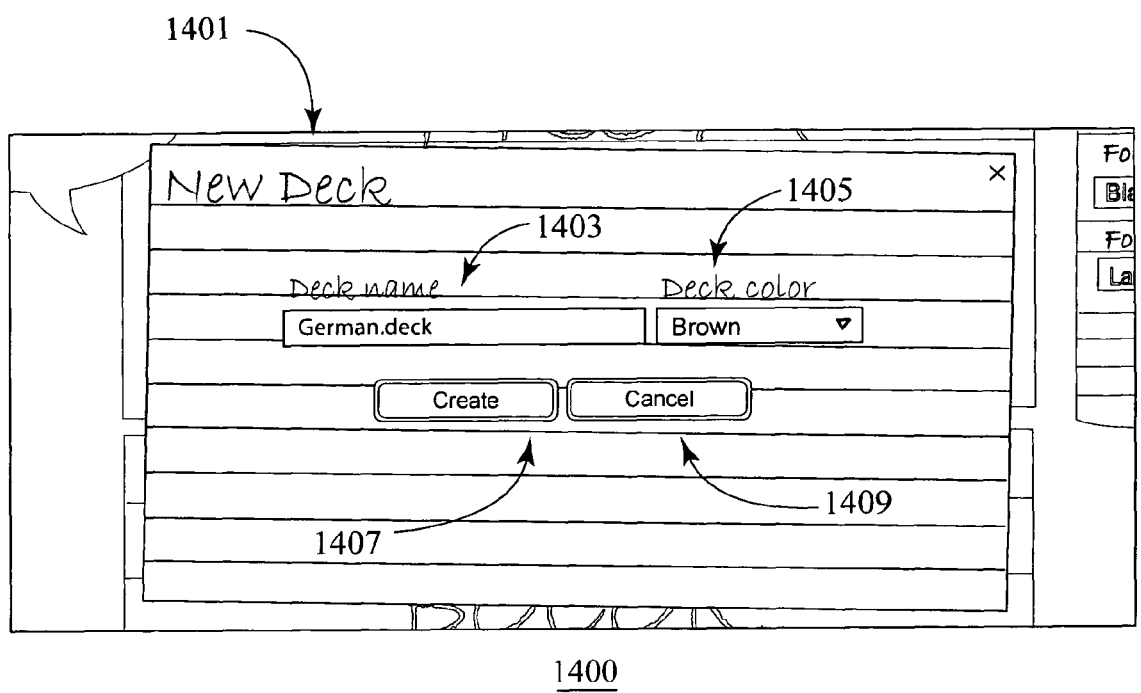
FIG. 14 depicts an exemplary user interface for creating a collection of content in accordance with various embodiments.

With reference now to FIG. 14, exemplary user interface 1400 for creating a collection of content is depicted in accordance with various embodiments. Exemplary user interface 1400 includes title 1401, collection naming field 1403, collection visual stimulus selection field 1405, activity button 1407 and cancel activity button 1409.

Exemplary user interface 1400 provides functionality to allow a user to create a collection of one or more units of content. According one embodiment, exemplary user interface 1400 is accessed via "create deck" link in main menu 1001, as previously described. Exemplary user interface 1400 displays title 1401, one or more keywords describing the functionality of the currently displayed user interface. Exemplary user interface 1400 also includes collection naming field 1403. According to one embodiment, collection naming field 1403 allows the user to assign a name to the collection of units of content in the process of being created.

Collection visual stimulus selection field 1405 allows the user to assign a visual stimulus to the display of units of content within the collection. Visual stimulus may, for example, comprise color, shape, pattern or any such distinctive visual stimuli. According to one embodiment, visual stimulus may be unique to a specific collection of content. For example, no two collections of content may display the same visual stimulus, or combination of visual stimuli. As depicted, the current collection of content (e.g., "German.deck") is assigned the color brown. Accordingly, German.deck may, for example, have the color brown as the background for each unit of content in the collection. In further embodiments, each individual unit of content is also distinguished from a corresponding collection of content. In the above example, for instance, each unit of content in the German deck may have the color brown as the background for each unit of content, as well as a unique pattern or similar visual designation which includes the background color, but distinguishes the unit of content from other units of content in the same collection. Thus, a hierarchy of visual indicia (e.g., color to distinguish entire collections, pattern to distinguish specific units) may be associated with individual units.

Activity button 1407 allows the user to execute the activity referenced by title 1401. According to one embodiment, cancel activity button 1409 may also close user Interface 1400 and return the user to the last user interface viewed prior to user interface 1400, or execute a link to main menu 1001.

Editing Collection of Content

Figure 15:
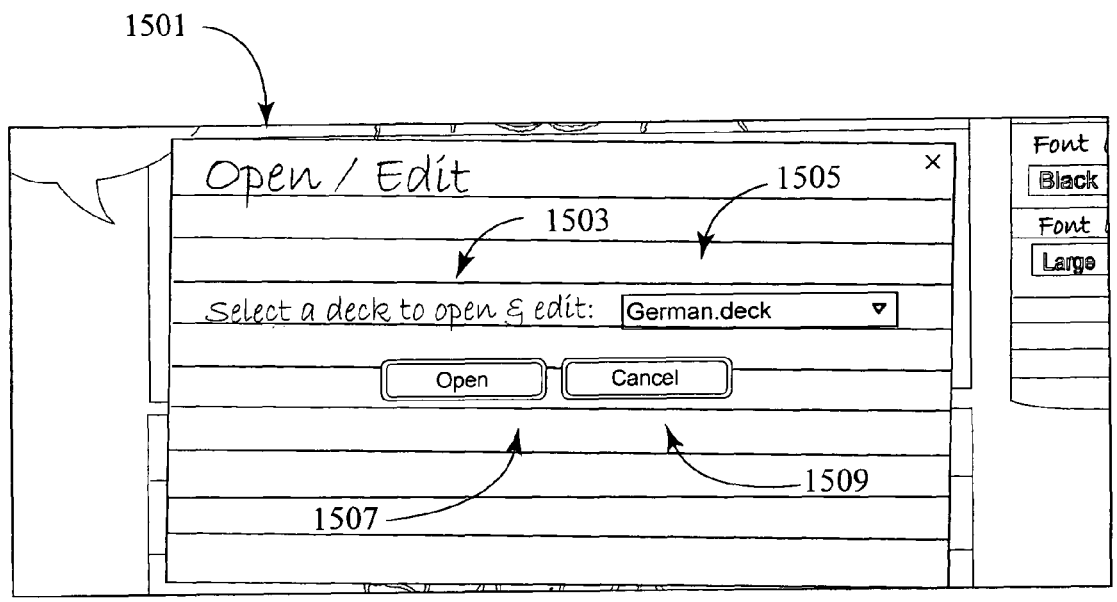
FIG. 15 depicts an exemplary user interface for viewing and a collection of content in accordance with various embodiments.

With reference now to FIG. 15, exemplary user interface 1500 for viewing and editing a collection of content is depicted in accordance with various embodiments. Exemplary user interface 1500 includes title 1501, instruction 1503, selection display 1505, activity button 1507 and cancel activity button 1509.

Exemplary user interface 1500 provides functionality to allow a user to select a collection of one or more units of content to view and/or edit. According to one embodiment, exemplary user interface 1500 is accessed via "open/edit" link in main menu 1001, as previously described. Exemplary user interface 1500 displays title 1501, one or more keywords describing the functionality of the currently displayed user interface. Exemplary user interface 1500 also displays instruction 1503. According to one embodiment, instruction 1503 displays a short instructional message describing the operation of exemplary user interface 1500. As depicted, instruction 1503 displays a short instructional message describing the procedure for viewing and editing a collection of content.

Selection display 1505 allows the user to view the file name of the file selected for export. Activity button 1507 allows the user to execute the activity referenced by title 1501 and described by instruction 1503. According to one embodiment, cancel activity button 1509 may interrupt and cancel the export of a file while the file is in the process of exporting. According to other embodiments, cancel activity button 1509 may also close user interface 1500 and return the user to the last user interface viewed prior to user interface 1500, or execute a link to main menu 1001.

Saving Content

Figure 16:
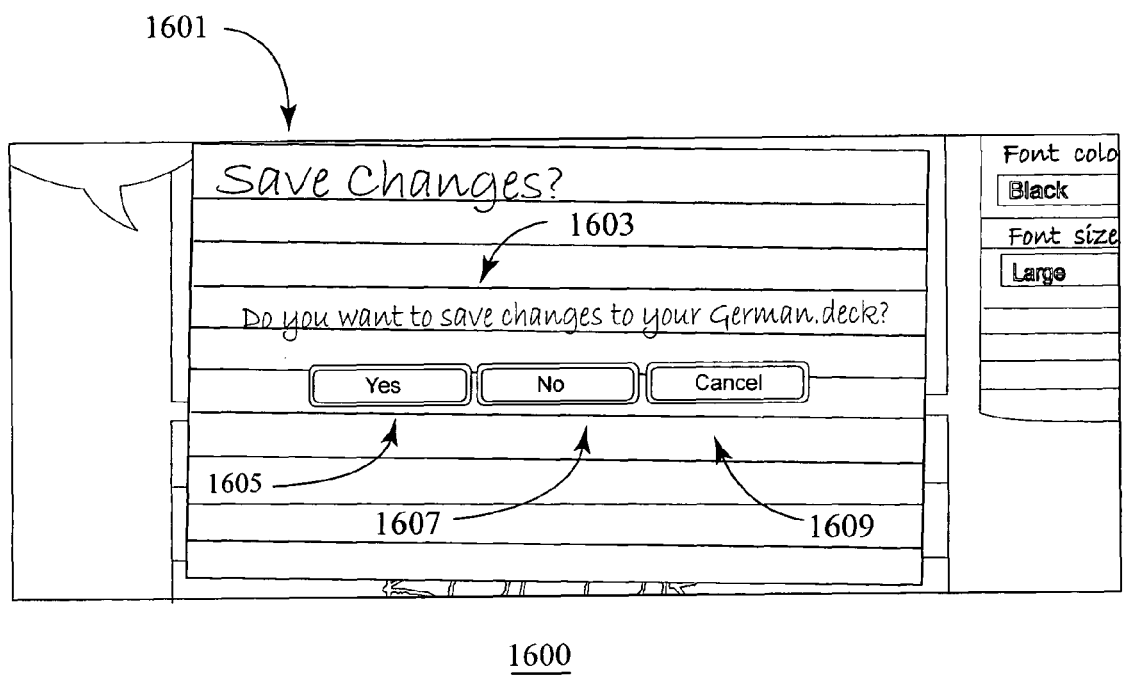
FIG. 16 depicts an exemplary user interface for saving modifications to a collection of content in accordance with various embodiments.

With reference now to FIG. 16, exemplary user interface 1600 for saving a collection of content is depicted in accordance with various embodiments. Exemplary user interface 1600 includes title 1601, instruction 1603, continue activity button 1605, stop activity button 1607 and cancel activity button 1609.

Exemplary user interface 1600 provides functionality to allow a user to save a collection of one or more units of content in the client application of the user. According to some embodiments, the collection of one or more units of content is saved to a web service platform. According to other embodiments, the collection of one or more units of content are saved locally in the client application of the user, or to the system of the user.

According to further embodiments, exemplary user interface 1600 is accessed via "save" link in main menu 1001, as previously described. Exemplary user interface 1600 displays title 1601, one or more keywords describing the functionality of the currently displayed user interface. Exemplary user interface 1600 also displays instruction 1603. According to one embodiment, instruction 1603 displays a short instructional message describing the operation of exemplary user interface 1600. As depicted, instruction 1603 displays a short instructional message describing the procedure for saving a collection of content from a location to the client application.

Continue activity button 1605 allows the user to affirm and the activity selected, and allows the application to proceed with executing the activity. As depicted, continue activity button 1605 allows the user to save any modifications to the currently viewed collection of content. Stop activity button 1607 allows the user to cease the activity selected. Cancel activity button 1609 may close user interface 1600 and return the user to the last user interface viewed prior to user interface 1600, or execute a link to main menu 1001.

User Interface for Creating Content

Figure 17:
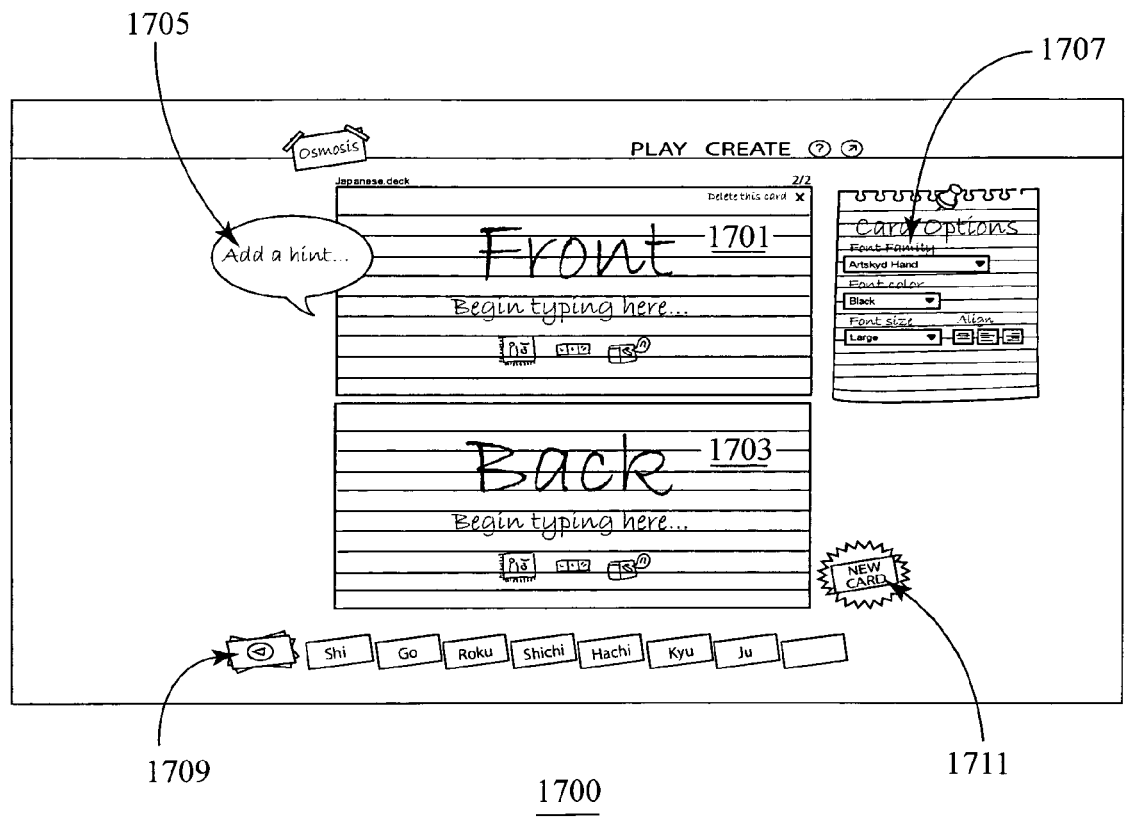
FIG. 17 depicts an exemplary user interface for creating a unit of content in accordance with various embodiments.

With reference now to FIG. 17, exemplary user interface 1700 for creating a unit of is depicted in accordance with various embodiments. Exemplary user interface 1700 includes reference display 1701, response display 1703, hint display 1705, card option menu 1707, navigation bar 1709, and new card button 1711.

Exemplary user interface 1700 provides functionality to allow a user to create a unit of content in the client application of the user. The unit of content may, for example, be one of the units of content comprising a collection of content. Reference display 1701 allows the user to enter the text or other data comprising the reference for the particular unit of content. For example, reference display 1701 may display a question, or media file associated with the concept or fact to be memorized. Response display 1703 allows the user to enter the text or other data comprising the response corresponding to the reference displayed in reference display 1701.

According to some embodiments, user interface 1700 includes a hint feature, which, when activated by the user during studying, displays to the user an additional reference which may be suggestive of the response. In these embodiments, user interface 1700 may include hint display 1705, which allows the user to enter the text and/or data comprising the additional reference that will be seen as the hint during studying.

User interface 1700 may also include card options menu 1707, which allows the user to adjust the formatting and style of the text in the current unit of content displayed in user interface 1700.

Navigation bar 1709 displays units of content already created within the collection of content. New card button 1711, when activated, adds a new unit of content to the deck. The new, blank unit of content becomes the current active card being edited. In one embodiment, activating new card button 1711 prompts the user to save the current active card being edited prior to making a new, blank unit of content the current active card.

Figure 18:
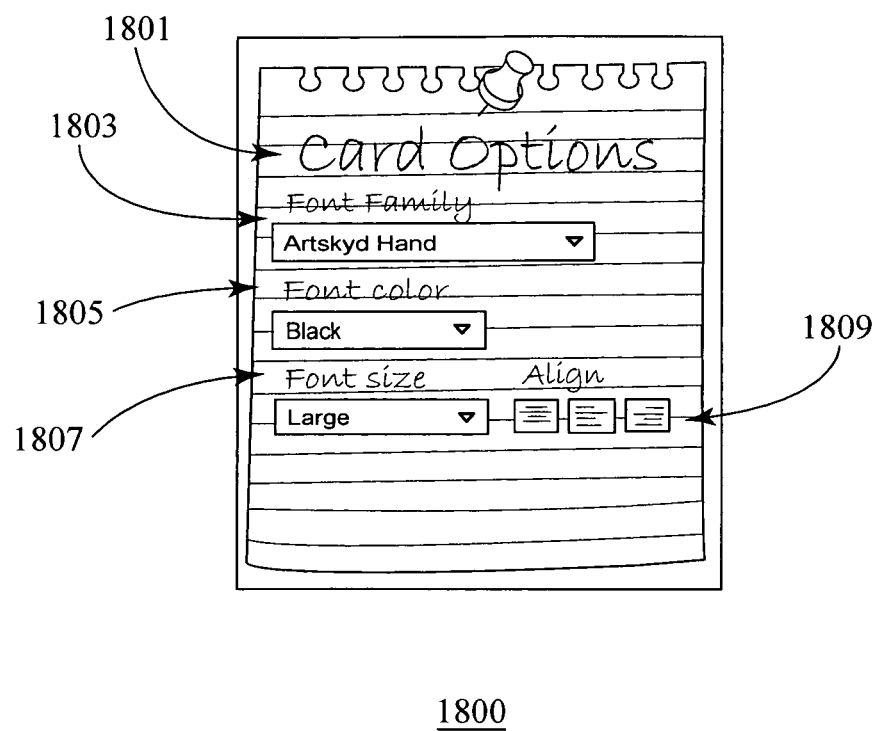
FIG. 18 depicts an exemplary user interface for altering the presentation of content in accordance with various embodiments.

With reference now to FIG. 18, exemplary card option menu 1800 for altering the presentation of content is depicted in accordance with various embodiments. Exemplary user interface 1800 includes title display 1801, font style bar 1803, font color bar 1805, font size bar 1807, and alignment bar 1809.

Exemplary card option menu 1800 provides functionality to allow a user to adjust the formatting and style of the text in the current unit of content entered by the user in user interface 1700.

Title display 1801 displays the title of the feature, indicating the functionality and purpose provided by the feature to the user. As depicted, title display 1801 displays "Card Options."

Font style bar 1803 allows the user to select the style of the font of the text entered by the user in user interface 1700. Similarly, font color bar 1805, font size bar 1807 and alignment bar 1809 allow the user to select the color, size, and alignment (respectively) of the text entered by the user in user interface 1700.

Figure 19:
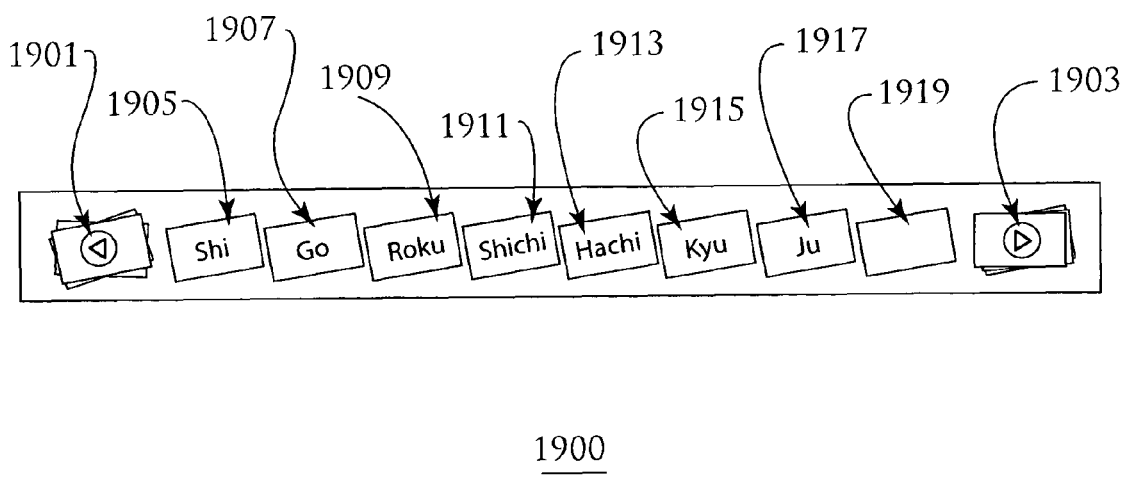
FIG. 19 depicts an exemplary navigation bar for collectively viewing and navigating a collection of enumerated content in accordance with various embodiments.

With reference now to FIG. 19, exemplary navigation bar 1900 for collectively viewing and navigating a collection of enumerated content is depicted in accordance with various embodiments. Exemplary navigation bar 1900 includes one or more navigation objects (e.g., navigation buttons 1901, 1903), enumerated content (e.g., units of content 1905, 1907, 1909, 1911, 1913, 1915, 1917), current display indicator 1919.

Navigation objects allow the user to navigate through a list of enumerated units of content. Navigation may be limited to a collection, or may extend to every unit of content within a storage device of content. According to one embodiment, navigation bar 1900 may include only one navigation object for unilateral navigation. According to other embodiments, navigation bar 1900 may incorporate more than one navigation object to allow for multi-lateral navigation. For example, as depicted, navigation bar 1900 includes two navigation objects (navigation button 1901, 1903), navigation button 1901 allows the user to modify the view of the navigation bar to units of content not included in the currently viewed units of content (e.g., the units of content "to the left" of units of content 1905, 1907, 1909, 1911, 1913, 1915, and 1917). Similarly, navigation button 1903 allows the user to modify the view of the navigation bar to units of content not included in the currently viewed units of content in the opposite direction of navigation button 1901 (e.g. the units of content "to the right" of units of content 1905, 1907, 1909, 1911, 1913, 1915, and 1917).

Current display indicator 1919 provides a visual indicator of the current position in the navigation bar of the currently displayed unit of content. Visual indicator may be provided, for instance, by a specific shape or color, or other such indication which is visibly distinct from the display of the other units of content in the navigation bar.

Alternate Exemplary User Interface

Figure 20:
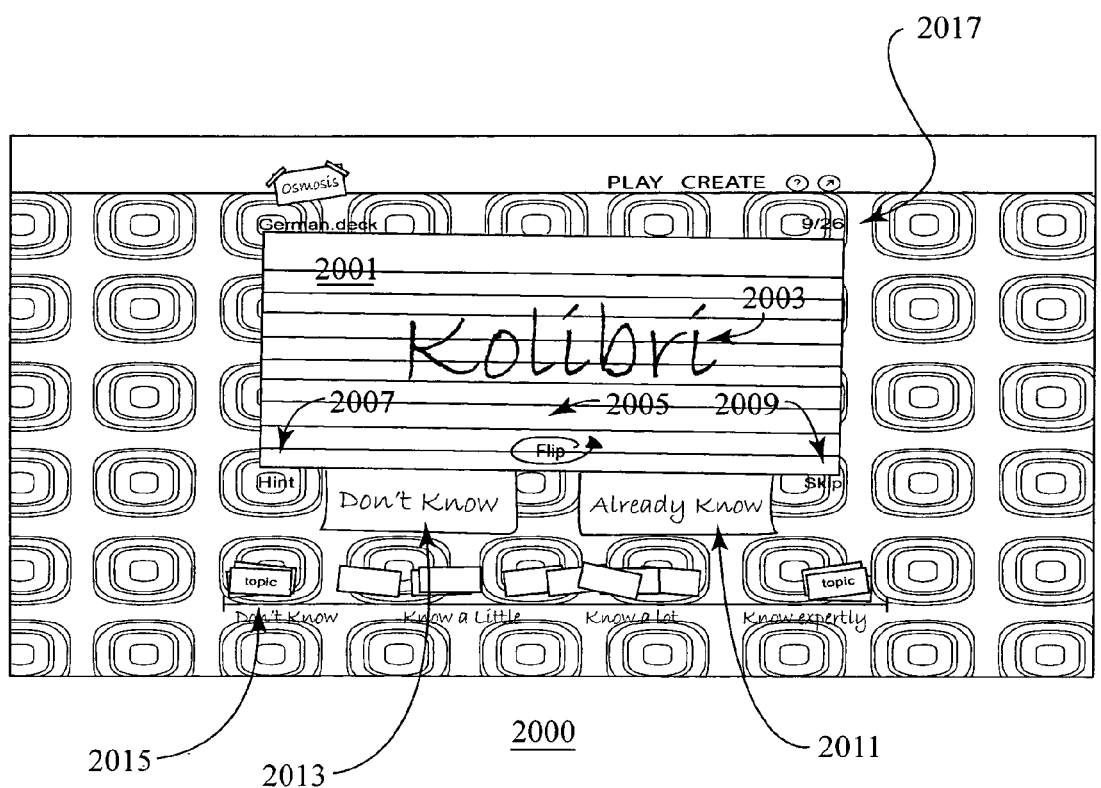
FIG. 20 depicts an alternate exemplary user interface for a unit of content in a collection of content in accordance with various embodiments.

With reference now to FIG. 20, an alternate exemplary user interface 2000 for a unit of content in a collection of content is depicted in accordance with various embodiments. Exemplary user interface 2000 includes content display 2001, reference 2003, display alternator 2005, hint display 2007, Change display button 2009, user response input fields (e.g., user input 2011 and 2013), progression bar 2015, and position indicator 2017.

In one embodiment, content display 2001 displays either the reference or the response contained in the currently displayed unit of content. As depicted, content display 2001 displays reference 2003 (e.g., "kolibri"). A user can alternate the display between the reference and the response through activating display alternator 2005. In embodiments which include the ability to provide additional reference material (e.g., a "hint") to be displayed along with the reference, hint display 2007 may be activated to display the additional reference material, or to remove the display of the additional reference material, if the additional reference material is currently displayed.

Change display button 2009 changes the currently viewed unit of content. For example, in one embodiment change display button 2009 changes the current display to the next unit of content determined by an order (e.g., an optimized order). In a further embodiment, when change display button 2009 is activated, the current display is changed to display the reference in the next unit of content, regardless of whether the reference was being displayed prior to activation of the change display button. In another embodiment, change display button 2009 changes the currently displayed unit according to a random order.

While content display 2001 displays a reference, User response input fields allow the user to submit a response to the reference displayed. (e.g., user input 2011 and 2013). For example, user response input field may allow the user to indicate the user's knowledge, or lack thereof, of the correct response to a reference. For example, as depicted, user response input field allows the user to submit the user's belief that the user knows the correct response (e.g., by selecting user input 2011, "Already Know") or believes the user lacks the knowledge of the correct response (e.g., by selecting user input 2013, "Don't Know"). In other embodiments, user response input field may allow the user to submit an actual response or to allow the user to select between one or more provided responses, and to compare the user's submitted response to the correct response.

According to some embodiments, the user's response is received as feedback and utilized to adjust the order of subsequent units of content presented. For example, an order which has scheduled the display of a unit of content which the user has indicated a lack or uncertainty of knowledge may be altered to subsequently display the unit of content earlier and/or with greater frequency than originally ordered. On the other hand, an order which has scheduled the display of a unit of content which the user has indicated certain knowledge of may be altered to subsequently display the unit of content at a later time and/or with less frequency than originally ordered. In either case, the magnitude of the repositioning may be increased with consistent responses to subsequent displays of the same unit of content.

Progression bar 2015 indicates the progression of memorization for units of content achieved by the user in the current collection of content. As depicted, progression bar 2015 displays a range of memorization (or knowledge) and a visual indicator of units of content along the range of memorization achieved by the user. For example, a user is able to see how many units of content the system has determined the user memorized well, and how many units of content the system has determined the user to have memorized poorly. In other embodiments, the user is able to see specific references to the units of content along the range of memorization.

Position indicator 2017 displays the position of the current displayed unit of content relative to other units of content that may be viewed by the user. For example, position indicator 2017 may display the position of the current displayed unit of content relative to the total number of units of content within the same collection of content.

According to some embodiments, the user is able to initiate a viewing session of a plurality of collections of content. Accordingly, position indicator 2017 may display the position of the current displayed unit of content relative to the number of total units of content selected for that session.

Figure 21:
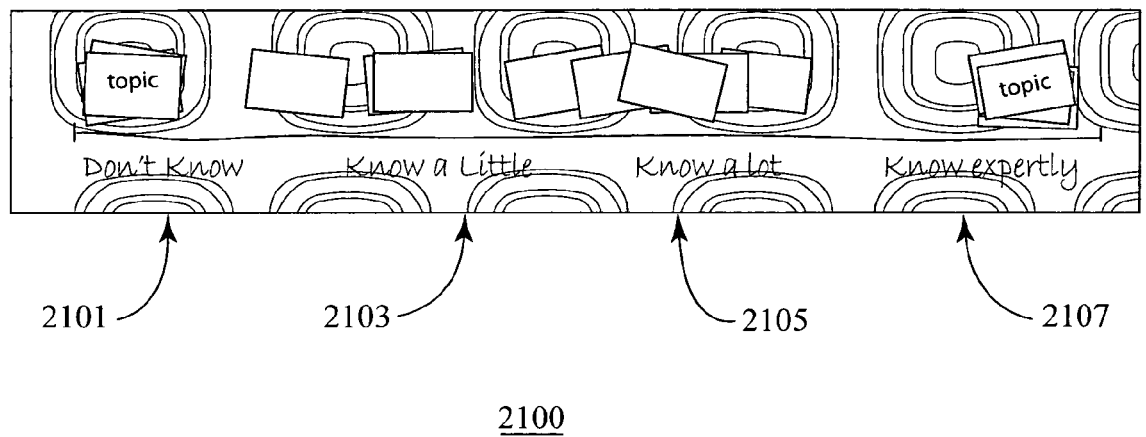
FIG. 21 depicts an exemplary progression indicator for an un-enumerated collection of content in accordance with various embodiments.

With reference now to FIG. 21, an exemplary progression indicator 2100 for a plurality of collections of content is depicted in accordance with various embodiments. Exemplary progression indicator 2100 is implemented as a scale displaying content according to a range of knowledge corresponding to a plurality of knowledge indicators (e.g., knowledge indicators 2101, 2103, 2105, 2107).

As depicted, exemplary progression indicator 2100 displays a range of knowledge (e.g., "Don't know," "Know a little," "Know a lot," and "Know expertly), enumerated by knowledge indicators 2101, 2103, 2105, 2107, respectively. Content, represented in the exemplary depiction as cards, is distributed and displayed within the range of knowledge corresponding to the user's achieved memorization, as calculated by the system from the user's feedback. Content may consist of either single units of content, or entire collections of content. In some embodiments, collections of content may be distinguished from single units of content. For example, collections of content may be designated as such, may display the defining attribute of the collection, or may include other visual distinction (e.g., shape, color, pattern, etc.)

Basic Computing Device

Figure 22:
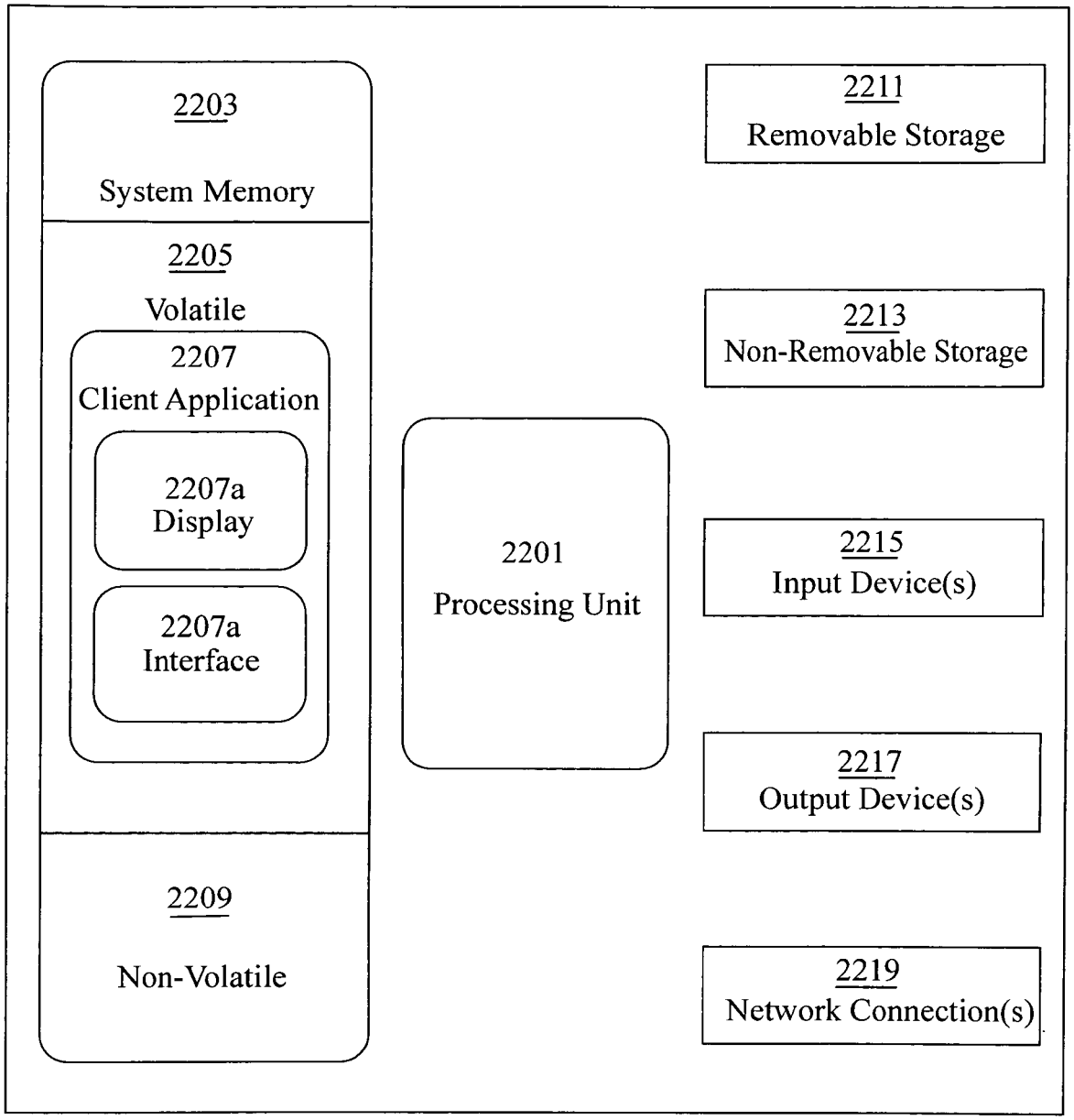
FIG. 22 depicts an exemplary computing device in accordance with various embodiments.

FIG. 22 shows an exemplary computing device 2200 according to various embodiments. Computing device 2200 depicts the components of a basic computer system providing the execution platform for certain software-based functionality in accordance with various embodiments. Computing device 2200 may be the environment upon which the method for optimizing data storage is instantiated, according to various embodiments.

Computing device 2200 can be implemented as, for example, a desktop computer system, laptop computer system or server computer system. Similarly, computing device 2200 can be implemented as a handheld device (e.g., personal data assistant), a wireless communications device (e.g., cellular phone, pager, or a device which combines features of one or more of such devices (e.g., a smart phone). Computing device 2200 typically includes at least some form of computer readable media. Computer readable media can be a number of different types of available media that can be accessed by computing device 2200 and can include, but is not limited to, computer storage media.

In its most basic configuration, computing device 2200 typically includes processing unit 2201 and memory 2203. Depending on the exact configuration and type of computing device 2200 that is used, memory 2203 can be volatile 2205 (such as RAM), non-volatile 2209 (such as ROM, flash memory, etc.) or some combination of the two. In one embodiment, client application 2207 is implemented in volatile memory 2205 to display content (e.g., units of content or collections of content) to a user and to receive user feedback.

According to one embodiment, client application 2207 accesses the storage component of a core web service platform to obtain one or more discrete units of content and an order to display the one or more discrete units of content. Once the content and order are obtained, display 2207a displays the one or more discrete units of content to a user according to the order. Interface 2207b is manipulated by the user in response to the displayed units of content. User response is received as feedback corresponding to the one or more discrete units of content displayed. Once feedback has been received, connection with the core web service platform is reestablished, the feedback is transmitted to the core web service platform to re-optimize the order; and the order of displaying the one or more discrete units of content is optimized according to the feedback from the user received.

In some embodiments, computing device 2200, upon which client application 2207 is implemented, may not be able to reestablish connection with the core web service platform as soon as user response is received. According to these embodiments, order may not be re-optimized until connection with the core web service platform is reestablished. The units of content subsequently displayed to the user would thus follow the last order (which may or may not have been optimized). While disconnected from the core web service platform, user response would be logged by the client application. Upon reconnection with core web service platform, the log of user feedback and the order the units of content were displayed while disconnected may be transmitted to the core web service platform as data, whereupon the data is synchronized, and the order is optimized according to the transmitted data.

Additionally, computing device 2200 can include mass storage systems (removable 2211 and/or non-removable 2213) such as magnetic or optical disks or tape. Client application 2207 may also be implemented both removable 2215 and non-removable 2217 mass storage systems. Similarly, computing device 2200 can include input devices 2219 and/or output devices 2221 (e.g., such as a display). Additionally, computing device 2200 can include network connections 2222 to other devices, computers, networks, servers, etc.

using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for presenting one or more discrete units of content to a user in a system for memorization, the method comprising:
   obtaining the one or more discrete units of content selected for memorization and an order to display the one or more discrete units of content to the user;
   displaying the one or more discrete units of content to the user according to the order obtained;
   receiving feedback from the user corresponding to the one or more discrete units of content displayed, the feedback comprising at least a user rating indicative of a difficulty of the one or more discrete units of content;
   displaying a plurality of additional references corresponding to the one or more discrete units of content and suggestive of the one or more discrete units of content in response to receiving feedback from the user not in conformance with the correct response;
   generating a model of memorization behavior for the user based on the feedback received from the user; and
   adjusting the order of the one or more discrete units of content based on the generated model of memorization behavior for the user.

2. The method of claim 1, the method further comprising tracking a progress of memorization achieved by the user based on the feedback received from the user corresponding to the content displayed.

3. The method of claim 2, the method further comprising informing the user of the progress of memorization achieved by the user corresponding to the content displayed.

4. The method of claim 1, the method further comprising:
   storing the feedback from the user corresponding to the one or more discrete units of content displayed in the storage component; and
   updating the order of the one or more discrete units of content stored in the storage component to conform to the optimized order.

5. The method of claim 1, wherein adjusting the order to of the one or more discrete units of content based on the feedback received comprises:
   adjusting the order of the one or more discrete units of content such that, for a discrete unit of content corresponding to user feedback indicating a lack of memorization, a frequency of display for the discrete unit of content is increased.

6. The method of claim 1, wherein adjusting the order further comprises adjusting the model based on time constraints.

7. The method of claim 6, wherein time constraints comprise user-input.

8. The method of claim 1, wherein feedback from the user comprises user input indicating a progress of memorization achieved by the user of the one or more discrete units of content displayed.

9. The method of claim 1, wherein the one or more discrete units of content is entered into the system by the user.

10. The method of claim 1, wherein the one or more discrete units of content are delineated from one or more other discrete units of content in the system.

11. A system for executing a memory optimization application, the system comprising:
    a user interface for allowing the user to create, manage and share one or more flash cards, a flash card having a reference to material to be memorized, a correct response corresponding to the reference, and an additional reference suggestive of the correct response;
    a display for displaying the flash cards according to an order;
    an input terminal for receiving input from the user in response to the reference of the flash card, the input from the user comprising at least a user rating indicative of a difficulty of the one or more flash cards;
    a comparison engine for comparing the input from the user to the correct response of the flash card; and
    an optimizing engine for generating a user behavior model based on the input received from the user in response to the reference of the flash card,
    wherein an order to display the flash cards is adjusted based on the generated user behavior model,
    further wherein, the display is further configured to display the additional reference suggestive of the correct response for each of the one or more flash cards when input from the user in response to the reference of a flash card does not conform to the correct response.

12. The system according to claim 11, wherein the display further comprises a visual indicator of a progress of memorization achieved by the user corresponding to the flash cards displayed to the user.

13. The system according to claim 11, wherein the display displays the flash cards individually.

14. The system according to claim 11, wherein the display further comprises one or more visual stimuli specific to one or more flash cards.

15. A system for executing a memory optimization application comprised on a non-transitory computer readable medium, the system comprising:
    a client application for implementing:
      a graphical display for displaying a content comprising one or more portions of material to be memorized for a user, and one or more additional references corresponding to the one or more portions of material and suggestive of a desired response form the user, the one or more additional references being displayed when a user input does not conform to the desired response for a displayed portion of material to be memorized;
      a user interface for receiving feedback from the user corresponding to the content displayed, the feedback comprising at least a user rating indicative of a difficulty of the one or more portions of material; and
    a core web service platform for generating a model of user memorization behavior, the core web service platform comprising a storage component for storing a plurality of material to be memorized,
    wherein, the client application connects to the storage component of the core web service platform to reference one or more portions of the material to be memorized and an order to display the one or more portions of the material to be memorized for a user,
    further wherein the model of user memorization behavior is adjusted based on the feedback received from the user, and the order of displaying the content is adjusted based on the model of user memorization behavior.

16. The system according to claim 15, wherein the client application is implemented as a web page.

17. The system according to claim 15, wherein the core web service platform is hosted on a computerized device communicatively coupled to the computerized device instantiating the client application.

18. The system according to claim 15, wherein the system is a computer system.

19. The system according to claim 15, wherein the system is a hand-held computing device.

20. The system according to claim 15, wherein the system is a wireless communications device.

21. The method according to claim 1, wherein the plurality of additional references comprise pre-stored content.

22. The method according to claim 1, wherein the plurality of additional references comprise pre-stored user input.

23. The method according to claim 1, wherein an additional reference of the plurality of additional references comprises a hint suggestive of a correct response corresponding to a discrete unit of content.

* * * * *